(12) United States Patent
Powell, III et al.

(10) Patent No.: US 8,804,603 B2
(45) Date of Patent: Aug. 12, 2014

(54) TDMA WIRELESS COMMUNICATIONS SYSTEM AND RELATED METHODS

(75) Inventors: Nelson H. Powell, III, Penfield, NY (US); Nick Andrew Van Stralen, Bloomfield, NY (US)

(73) Assignee: Harris Corporation, Melbourne, FL (US)

( * ) Notice: Subject to any disclaimer, the term of this patent is extended or adjusted under 35 U.S.C. 154(b) by 314 days.

(21) Appl. No.: 13/441,195

(22) Filed: Apr. 6, 2012

(65) Prior Publication Data

US 2013/0265933 A1 Oct. 10, 2013

(51) Int. Cl.
*H04J 3/08* (2006.01)

(52) U.S. Cl.
USPC .......................................................... 370/315

(58) Field of Classification Search
CPC .......... H04W 56/001; H04W 56/0015; H04W 56/002; H04J 11/00
See application file for complete search history.

(56) References Cited

U.S. PATENT DOCUMENTS

| | | | |
|---|---|---|---|
| 7,590,589 B2 | 9/2009 | Hoffberg | |
| 7,653,394 B2 | 1/2010 | McMillin | |
| 7,710,944 B1 | 5/2010 | Yoon | |
| 7,768,992 B2 | 8/2010 | Pun | |
| 2009/0313310 A1 | 12/2009 | Thome et al. | |
| 2010/0202436 A1* | 8/2010 | Albert et al. | 370/350 |
| 2012/0044827 A1* | 2/2012 | In et al. | 370/252 |
| 2012/0287921 A1* | 11/2012 | Chowdhary et al. | 370/350 |
| 2013/0148626 A1* | 6/2013 | Van Stralen et al. | 370/330 |
| 2014/0029604 A1* | 1/2014 | Nicholls et al. | 370/350 |

FOREIGN PATENT DOCUMENTS

WO 2012011991 1/2012

* cited by examiner

*Primary Examiner* — Chirag Shah
*Assistant Examiner* — Amar Persaud
(74) *Attorney, Agent, or Firm* — Allen, Dyer, Doppelt, Milbrath & Gilchrist, P.A.

(57) ABSTRACT

A wireless communications system may include wireless communications devices communicating with one another via time division multiple access (TDMA). The wireless communications devices may include a time master device that may transmit a first synchronization message, a first maintenance message, and a timing head relay designation message. The wireless communications devices also include a timing head relay device corresponding to the timing head relay designation and may receive the first synchronization message, first maintenance message and timing head relay designation message. The timing head relay device may also transmit a second synchronization message and a second maintenance message. The wireless communications devices may also include a time forwarding device that may receive the second synchronization message and the second maintenance message, transmit a third synchronization message when a downstream wireless communications device is outside a range of the timing head relay device, and transmit a third maintenance message.

22 Claims, 11 Drawing Sheets

TDMA WIRELESS COMMUNICATIONS SYSTEM AND RELATED METHODS

FIELD OF THE INVENTION

The present invention relates to the field of communications and, more particularly, to wireless communications and related methods.

BACKGROUND OF THE INVENTION

Frequency hopping networks are widely used in wireless communications. For example, frequency hopping spread spectrum (FHSS) is a method of transmitting radio signals by rapidly switching a carrier among many frequency channels, using a pseudorandom sequence known to both the transmitter and receiver. It is typically used as a multiple access method in the frequency-hopping code division multiple access (FH-CDMA) scheme.

A frequency hopping network offers three main advantages over a fixed-frequency network. First, signals in a frequency hopping network are typically highly resistant to narrowband interference, for example. Signals in a frequency hopping network may also be difficult to intercept. For example, an FHSS signal typically appears as an increase in background noise to a narrowband receiver. Signals in a frequency hopping network may also share a frequency band with many types of conventional transmissions with reduced interference.

Because of the changing frequencies in a frequency hopping network, most frequency hopping networks cannot support the time division multiple access (TDMA) scheme. This is because it is often relatively difficult to control which communications device in the network is allocated time.

One approach to address the timing in a frequency hopping TDMA (FH-TDMA) network includes using fixed frequency rules, where each communications device is informed of timing information using a single frequency, for example. More particularly, a static time server, a beacon, or a rendezvous channel may be used. For example, a given communications device may be pre-designated as the static time server. However, a failure or stoppage of the communications device designated as the static time server would cause a failure of the entire network.

Additional communications devices may be designated as a static time server so the network does not have a single point of failure. However, coordinating or selecting the additional static time servers may be relatively complex. For example, conflicts may arise when two or more static time servers are selected. Conflicts may also arise as static time servers move in and out of communications range with other communications devices and each other.

U.S. Pat. No. 7,710,944 to Yoon et al. discloses a method of time of day synchronization between network nodes. More particularly, a network that includes a plurality of nodes is arranged in islands. Head nodes from each island are in communication with each other. Network time is synchronized with a node that has local global positioning system (GPS) time. Network nodes transition to common GPS time after an island or group head node determines that the transition in network time does not disturb the communication links.

SUMMARY OF THE INVENTION

In view of the foregoing background, it is therefore an object of the present invention to synchronize time among communications devices in a TDMA network.

This and other objects, features, and advantages in accordance with the present invention are provided by a wireless communications system that includes a plurality of wireless communications devices communicating with one another via time division multiple access (TDMA). The plurality of wireless communications devices includes a first wireless communications device defining a time master wireless communications device configured to transmit a first synchronization message including a time value and a hop count value. The time master wireless communications device is also configured to transmit a first maintenance message including unique identifiers (UIDs) of other wireless communications devices in a range of communications from the time master wireless communications device, and a timing head relay designation message.

The plurality of wireless communications devices also includes a second wireless communications device defining a timing head relay wireless communications device corresponding to the timing head relay designation. The timing head relay wireless communications device is configured to receive the first synchronization message, first maintenance message, and timing head relay designation message. The timing head relay wireless communications device is also configured to transmit a second synchronization message including an updated time value and an updated hop count, and transmit a second maintenance message. The second maintenance message includes unique identifiers (UIDs) of other wireless communications devices in a range of communications from the timing head relay wireless communications device.

The plurality of wireless communications devices also includes a third wireless communications device defining a time forwarding wireless communications device. The time forwarding wireless communications device is configured to receive the second synchronization message and the second maintenance message. The time forwarding wireless communications device is also configured to transmit a third synchronization message including a further updated time value and a further updated hop count when a downstream wireless communications device is outside a range of the timing head relay wireless communications device. The time forwarding wireless communications device is also configured to transmit a third maintenance message including unique identifiers (UIDs) of other wireless communications devices in a range of communications from the time forwarding wireless communications device. Accordingly, time among communications devices in a TDMA network may be synchronized, for example, without a centralized static time server.

The plurality of wireless communications devices may also communicate with one another via frequency hopping, for example. The time master wireless communications device may be configured to transmit the first synchronization message and the first maintenance message in a given TDMA time epoch. The timing head relay wireless communications device may be configured to transmit the second synchronization message and the second maintenance in a first subsequent TDMA time epoch. The time forwarding wireless communications device may be configured to transmit the third synchronization message in a second subsequent TDMA time epoch, for example.

The time master wireless communications device may be configured to transmit a time slot message including a designated time slot. The timing head relay wireless communications device may be configured to receive the time slot message and transmit in the designated time slot, for example. The time forwarding wireless communications device may be configured to transmit the third synchronization message in a random time slot, for example.

The time forwarding wireless communications device may be configured to determine when the downstream wireless communications device is in range of both the time forwarding wireless communications device and another wireless communications device. The time forwarding wireless communications device may also be configured to discontinue transmitting the third synchronization message when the hop count value to the downstream wireless communications device is greater than a hop count value from the another wireless communications device to the downstream wireless communications device.

Each wireless communications device may include a wireless transceiver and a processor coupled thereto, for example. Each wireless communications device may be a mobile wireless communications device, for example.

A method aspect is directed to a method of wireless communication in a wireless communications system including a plurality of wireless communications devices communicating with one another via time division multiple access (TDMA). The method includes transmitting from a first wireless communications device from among the plurality of mobile wireless communications devices defining a time master wireless communications device, a first synchronization message comprising a time value and a hop count value. The method also includes transmitting from the time master wireless communications device a first maintenance message including unique identifiers (UIDs) of other wireless communications devices in a range of communications from the time master wireless communications device, and a timing head relay designation message.

The method further includes receiving, at a second wireless communications device from among the plurality of wireless communications devices defining a timing head relay wireless communications device corresponding to the timing head relay designation, and from among the plurality of wireless communications devices, the first synchronization message, first maintenance message, and timing head relay designation message. The method also includes transmitting, from the timing head relay wireless communications device, a second synchronization message comprising an updated time value and an updated hop count, and a second maintenance message comprising unique identifiers (UIDs) of other wireless communications devices in a range of communications from the timing head relay wireless communications device.

The method further includes receiving, at a third wireless communications device from among the plurality of mobile wireless communications devices defining a time forwarding wireless communications device, the second synchronization message and the second maintenance message, transmitting from the time forwarding wireless communications device a third synchronization message including a further updated time value and a further updated hop count when a downstream wireless communications device is outside a range of the timing head relay wireless communications device. The method also includes transmitting, from the time forwarding wireless communications device, a third maintenance message including unique identifiers (UIDs) of other wireless communications devices in a range of communications from the time forwarding wireless communications device.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
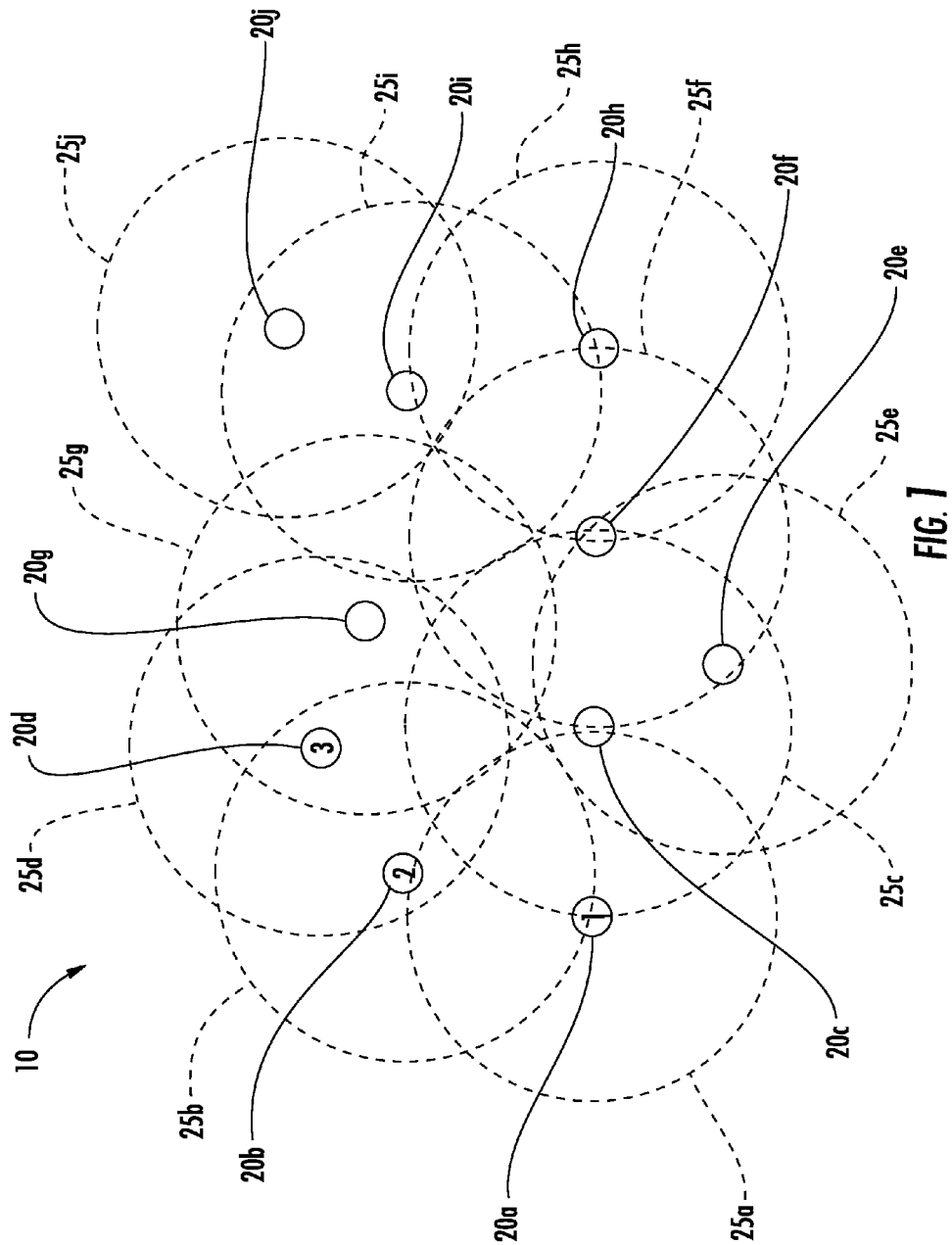
FIG. 1 is a schematic diagram of a wireless communications system in accordance with the present invention.
Figure 2:
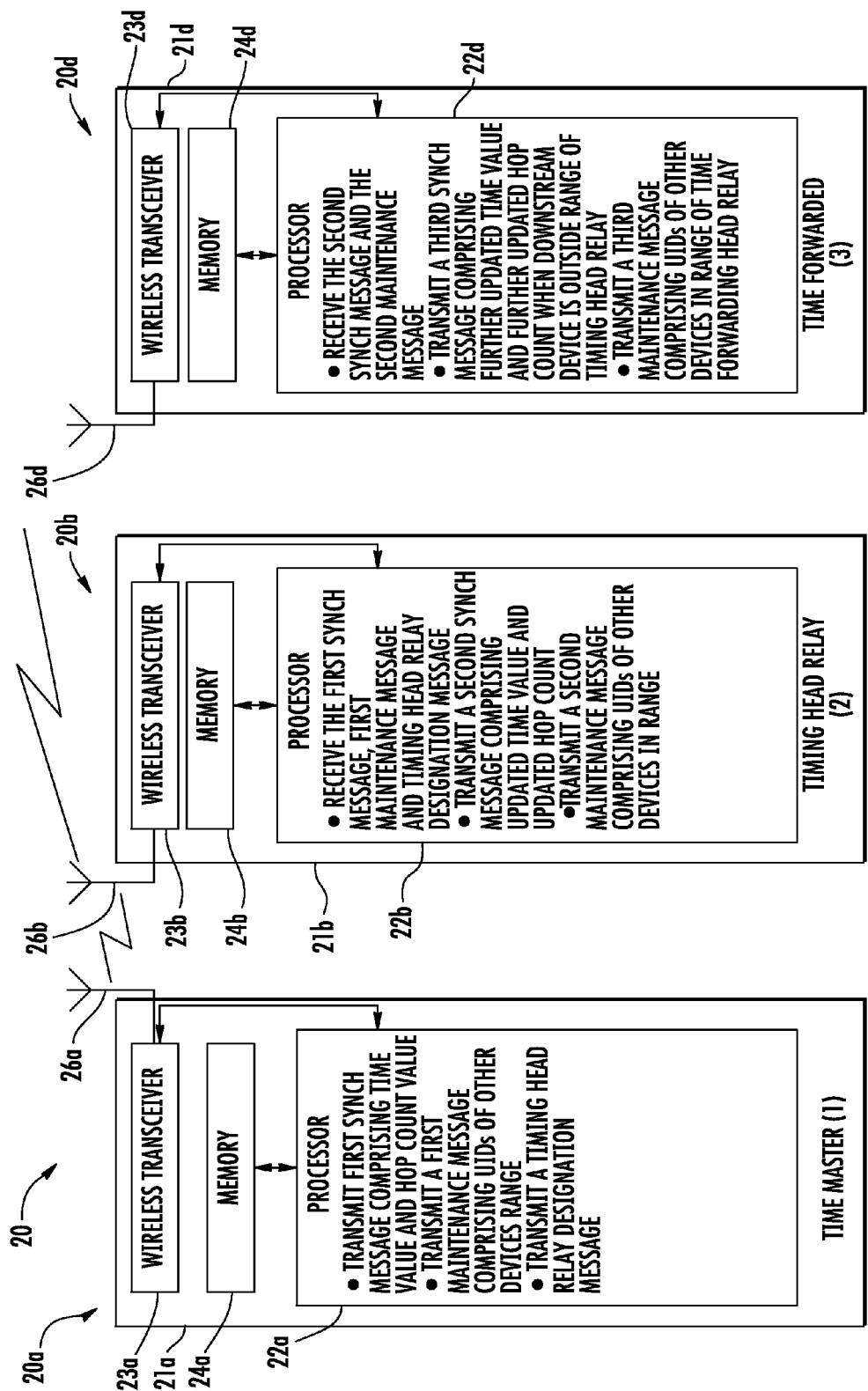
FIG. 2 is a schematic block diagram of mobile wireless communications devices of the wireless communications system of FIG. 1.

Referring initially to FIGS. 1 and 2, a wireless communications system 10 includes mobile wireless communications devices 20 communicating with one another via time division multiple access (TDMA) and via frequency hopping. As will be appreciated by those skilled in the art, the wireless communications system 10 may be in a form of a TDMA frequency hopping mobile ad hoc network (MANET), for example. In some embodiments, one or more of the wireless communications devices 20 may not be mobile.

Each of the mobile wireless communications devices 20 may be classified as a particular type of mobile wireless communications device based upon its functionality within the network, as will be described in further detail below. More particularly, a given mobile wireless communications device may be a time master mobile wireless communications device, a time relay mobile wireless communications device, or a time forwarding mobile wireless communications device. Of course, a given mobile wireless communications device may be classified as another or none of the above classifications.

The mobile wireless communications devices 20 include a time master mobile wireless communications device 20a. The time master mobile wireless communications device 20a illustratively includes a housing 21a and a processor 22a or controller carried by the housing 21a (FIG. 2). A wireless transceiver 23a is also carried by the housing 21a and coupled to the processor 22a. An antenna 26a is coupled to the wireless transceiver 23a. The wireless transceiver 23a and the processor 22a cooperate to perform a wireless communication function, for example, voice and/or data. The wireless transceiver 23a and the processor 22a may cooperate to perform other functions.

A memory 24a is also carried by the housing 21a and is coupled to the processor 22a. The memory 24a may include instructions for causing the processor 22a to perform the operations described herein. The memory 24a may include other data, as will be appreciated by those skilled in the art.

The time master mobile wireless communications device 20a is configured to transmit a first synchronization message in a given TDMA time epoch. The first synchronization message includes a time value, a hop count value, and a time slot transmission value. The time slot transmission value corresponds to the time slot in the given TDMA epoch that the synchronization message is transmitted.

As will be appreciated by those skilled in the art, the time master mobile wireless communications device 20a has a hop count value of zero. The time value may be a time-of-day value, for example. The time value may be another type of time value, for example, absolute time. The time master mobile wireless communications device 20a is also configured to transmit a first maintenance message in the given TDMA time epoch. The first maintenance message includes unique identifiers (UIDs) of other wireless communications devices in a range of communications 25a from the time master mobile wireless communications device 20a.

As will be appreciated by those skilled in the art, each of the mobile wireless communications devices 20 transmit a maintenance message that includes UIDs of other wireless communications devices in a range of communications from a given mobile wireless communications device. Accordingly, a given mobile wireless communications device is aware of which mobile wireless communications devices can be heard by certain ones of the mobile wireless communications devices 20. A given mobile wireless communications device may use an exclusive OR function to determine with which mobile wireless communications device its neighbors can communicate. Further details of how UIDs are used in the wireless communications system 10 are described in further detail below.

The time master mobile wireless communications device 20a is also configured to transmit a timing head relay designation message in the given TDMA time epoch. The timing head relay designation message designates two mobile wireless communications devices, in the range of communications 25a, as timing head relay mobile wireless communications devices, i.e. 20b, 20c. Of course, the time master mobile wireless communications device 20a may designate a single or more than two mobile wireless communications devices as timing head relay mobile wireless communications devices.

The time master mobile wireless communications device 20a is also configured to transmit a time slot message including a designated time slot. More particularly, the time slot message designates which time slot receiving mobile wireless communications devices, for example, timing head relay mobile wireless communications devices 20b, 20c, are to transmit. As noted above, the time slot of the given TDMA epoch that the synchronization message is transmitted in is included within the synchronization message itself.

The timing head relay mobile wireless communications devices 20b, 20c each correspond to the timing head relay designation. Each timing head relay mobile wireless communications device 20b, 20c includes a housing 21b and a processor 22b or controller carried by the housing 21b. A wireless transceiver 23b is also carried by the housing 21b and coupled to the processor 22b. An antenna 26b is coupled to the wireless transceiver 23b. The wireless transceiver 23b and the processor 22b cooperate to perform a wireless communication function, for example, voice and/or data. The wireless transceiver 23b and the processor 22b may cooperate to perform other functions.

A memory 24b is also carried by the housing 21b and is coupled to the processor 22b. The memory 24b may include instructions for causing the processor 22b to perform the operations described herein. The memory 24b may include other data, as will be appreciated by those skilled in the art.

Each timing head relay wireless communications device 20b, 20c is configured to receive the first synchronization message, the first maintenance message, and timing head relay designation message. Each timing head relay wireless communications device 20b, 20c is also configured to transmit a respective second synchronization message that includes an updated time value and an updated hop count, for example, an updated hop count of 1. In other words, each time head relay mobile wireless communications device 20b, 20c is one hop from the time master mobile wireless communications device 20a.

Each timing head relay mobile wireless communications device 20b, 20c is also configured to transmit a second maintenance message. The second maintenance message includes UIDs of other wireless communications devices in a range of communications, i.e. 25b, 25c, respectively, from the timing head relay wireless communications device 20b, 20c. More particularly, the timing head relay mobile wireless communications devices 20b, 20c are aware that the time master wireless communications device 20a can communicate with mobile wireless communications devices 20b, 20c. The first timing head relay mobile wireless communications device 20b is aware that it can communicate with mobile wireless communications device 20d. The second timing head relay mobile wireless communications device 20c is also aware it can communicate with mobile wireless communications devices 20e, 20f. The timing head relay mobile wireless communications devices 20b, 20c, each transmit in a first subsequent TDMA time epoch.

The mobile wireless communications devices 20 also include time forwarding wireless communications devices 20d-20f. Each time forwarding mobile wireless communications device 20d-20f illustratively includes a housing 21d and a processor 22d or controller carried by the housing 21d. A wireless transceiver 23d is also carried by the housing 21d and coupled to the processor 22d. An antenna 26d is coupled to the wireless transceiver 23d. The wireless transceiver 23d and the processor 22d cooperate to perform a wireless communication function, for example, voice and/or data. The wireless transceiver 23d and the processor 22d may cooperate to perform other functions.

A memory 24d is also carried by the housing 21d and is coupled to the processor 22d. The memory 24d may include instructions for causing the processor 22d to perform the operations described herein. The memory 24d may include other data, as will be appreciated by those skilled in the art.

Each time forwarding wireless communications device 20d-20f is configured to receive the respective second synchronization message and the second maintenance message from timing head relay mobile wireless communications devices 20b, 20c. In other words, time forwarding mobile wireless communications device 20d receives the second synchronization message and the second maintenance message from the first timing head relay module 20*b*, and time forwarding mobile wireless communications devices 20*e*, 20*f* receive the second synchronization message and the second maintenance message from the second timing head relay module 20*c*.

Each time forwarding wireless communications device 20*d*-20*f* is also configured to transmit a third synchronization message including a further updated time value and a further updated hop count (hop count=2) when a downstream mobile wireless communications device, 20*g*-20*h* is outside a range (i.e., 25*b*, 25*c*, respectively) of one of the timing head relay wireless communications devices 20*b*, 20*c*, respectively. Each time forwarding mobile wireless communications device 20*d*-20*f* is also configured to transmit a respective third maintenance message including UIDs of other wireless communications devices (e.g., 20*b*, 20*c*, 20*g*, 20*h*) in a range of communications (i.e., 25*d*-25*f*) from the respective time forwarding wireless communications device. The third synchronization messages and third maintenance messages are transmitted in a second subsequent TDMA time epoch in a random time slot.

As will be appreciated by those skilled in the art, the time forwarding mobile wireless communications devices 20*d*-20*f* "self elect" to transmit in the random time slot, as compared to the time head relay mobile wireless communications devices 20*b*, 20*c*, which are directed, from the time master mobile wireless communications device 20*a*, to transmit in the designated time slot.

By way of example, mobile wireless communications device 20*d* is aware that mobile wireless communications device 20*g* has a wireless communications range 25*g* that includes no other mobile wireless communications devices for example, transmitting a timing head relay or time forwarding message. Mobile wireless communications device 20*d* elects itself as a time forwarding wireless communications device and transmits to mobile wireless communications device 20*g*.

Each time forwarding wireless communications device 20*d*-20*f* is configured to determine when the downstream wireless communications device (e.g., 20*g*, 20*h*) is in range (i.e., 25*d*-25*f*) of both the time forwarding wireless communications device 20*d*-20*f* and another wireless communications device (i.e., 25*i*, 25*f*, 25*g*). Each time forwarding wireless communications device 20*d*-20*f* may also be configured to discontinue transmitting the third synchronization message when the hop count value to the downstream wireless communications device 25*g*, 25*h* is greater than a hop count value from the another wireless communications device 20*i* to the downstream wireless communications device.

By way of example, mobile wireless communications device 20*e* is aware that mobile wireless communications device 20*f* has a wireless communications range 25*f* that includes both the time head relay mobile wireless communications device 20*c* and mobile wireless communications device 20*e*. Mobile wireless communications device 20*f* is one hop away from the time head relay wireless communications device 20*c* (hop count value=2) and two hops away from the time head relay wireless communications device 20*c* via mobile wireless communications device 20*e* (hop count value=3). Thus, mobile wireless communications device 20*e* does not elect itself as a time forwarding wireless communications device and, thus, does not transmit synchronization messages.

Moreover, mobile wireless communications device 20*f* is aware that, notwithstanding mobile wireless communications device 20*e*, only mobile wireless communications device 20*h* is within the wireless communications range 25*f* of mobile wireless communications device 20*f*. Mobile wireless communications device 20*f* then elects itself as a time forwarding mobile wireless communications device. Similarly, mobile wireless communications device 20*h*, which receives synchronization and maintenance messages from mobile wireless communications device 20*f*, is aware that it can only be heard by mobile wireless communications device 20*i*, and thus elects itself as a time forwarding mobile wireless communications device. The process continues, and as noted above, as mobile wireless communications device 20*i* elects itself as a time forwarding mobile wireless communications device and transmits to mobile wireless communications device 20*j*.

Any discrepancies, for example, where a given mobile wireless communications device 20 is in a wireless communications range 25 of more than one mobile wireless communications device, the mobile wireless communications device with the lower hop count will elect itself as a time forwarding mobile wireless communications device. The mobile wireless communications device with the higher hop count will not elect itself as a time forwarding mobile wireless communications device, or, if it is was previously elected as a time forwarding mobile wireless communications device, it discontinues transmitting synchronization messages. This may occur when, for example, a given mobile wireless communications device moves from a wireless communications range of one mobile wireless communications device to within a range of another mobile wireless communications device, as will be explained in further detail below.

Still further, each time forwarding mobile wireless communications device 20*d*-20*f*, 20*h*, 20*i* may advantageously be self correcting. Since each time forwarding mobile wireless communications device 20*d*-20*f*, 20*h*, 20*i* transmits a respective synchronization message in a random time slot, the possibility for a collision may exist. For example, suppose a collision happens at the timing head relay 20*b* that causes the timing head relay not to transmit in the next TDMA time epoch because of the collision. For example, this may be due to mobile wireless communications devices 20*d* and 20*a* transmitting time messages at a same time. Mobile wireless communications device 20*d* thus does not receive the messages from the timing head relay mobile wireless communications device 20*b*. In the next TDMA time epoch, assuming a same network topography, the timing head relay mobile wireless communications device 20*b* transmits based upon the messages received from the time master wireless communications device 20*a*. Accordingly, any collisions may be corrected within three TDMA time epochs.

Figure 3:
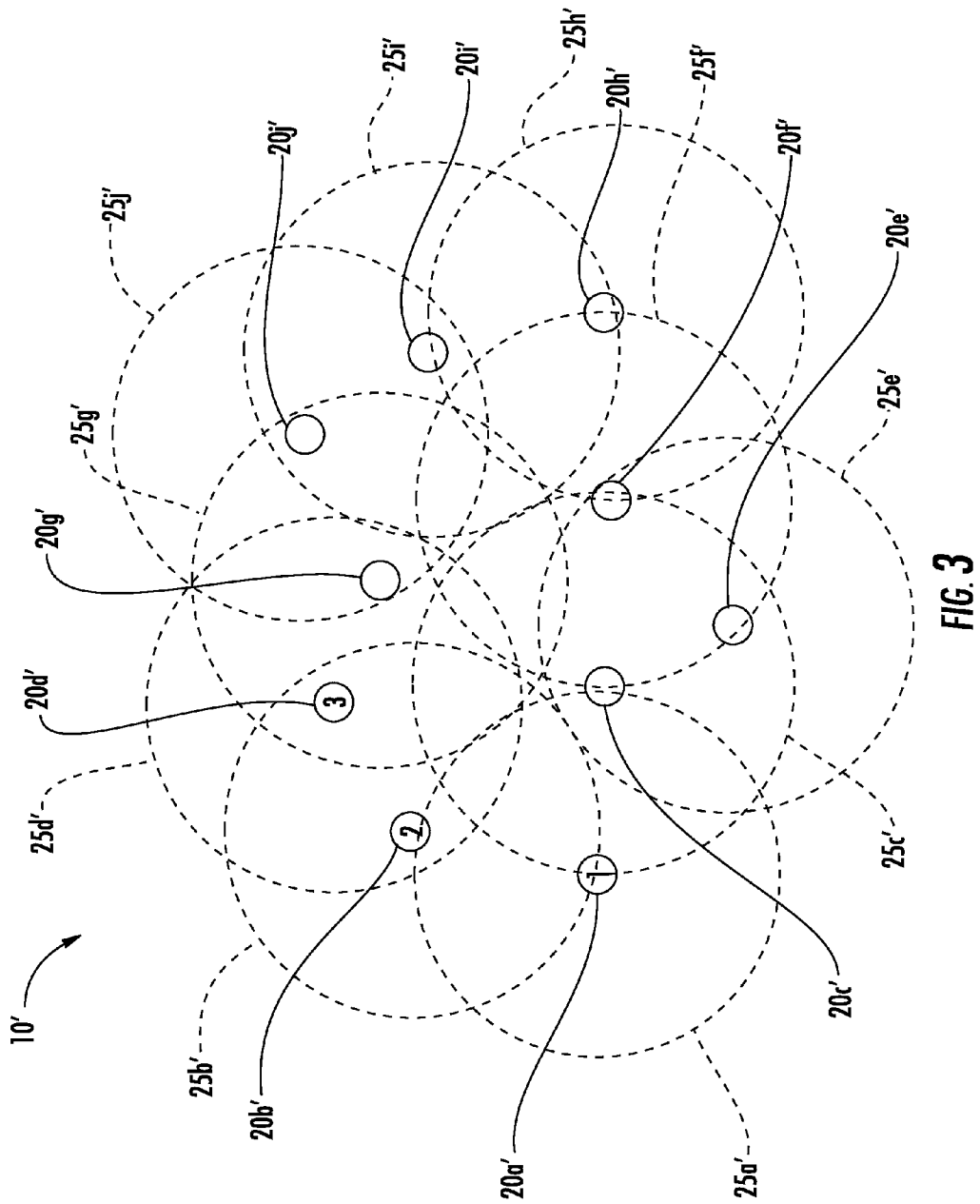
FIG. 3 is a schematic diagram of a wireless communications system in accordance with another embodiment of the present invention.

Referring now additionally to FIG. 3, illustratively, mobile wireless communications device 20*f'* has moved into the wireless communications range 25*g'* of mobile wireless communications device 20*g'*. It should be noted that mobile wireless communications device 20*f'* is still within the wireless communications range 25*i'* of mobile wireless communications device 20*i'*. As noted above, mobile wireless communications device 20*g'* is receiving third synchronization messages from the time forwarding mobile wireless communications device 20*d'*. As mobile wireless communications device 20*f'* moves into the communications range 25*g'* of mobile wireless communications device 20*g'*, mobile wireless communications device 20*f'* becomes aware of mobile wireless communications device 20*g'* being in communication range 25*f'*, mobile wireless communications device 20*f'* elects itself as a time forwarding mobile wireless communications device. Because mobile wireless communications device 20*f'* is not aware of the time forwarding mobile wireless communications device 20*d'*, when mobile wireless communications 20*j'* transmits its respective synchronization message, it includes a hop count value that is greater than 3 (i.e., 5).

Similarly, mobile wireless communications device 20*g'* would also want to elect itself as a time forwarding mobile wireless communications device, and transmits a respective synchronization message including a hop count value of 3 to mobile wireless communications device 20*j'*. The discrepancy between hop count values may be resolved as described above. More particularly, the mobile wireless communications device with the higher hop count, i.e., mobile wireless communications device 20*j'* will discontinue being a time forwarding mobile wireless communications device and discontinue transmitting respective synchronization messages.

As will be appreciated by those skilled in the art, the above description has been based upon propagation from a reference TDMA time epoch for simplicity. It should be understood, however, that the time master wireless communications device 20*a* transmits the first synchronization and first maintenance messages in each TDMA time epoch. Similarly, the time relay mobile wireless communications devices (e.g., 20*b*, 20*c*) will also transmit in each TDMA time epoch based upon the messages received from the time master mobile wireless communications device. Because of mobility, it may be possible that two mobile wireless communications devices that are designated as timing head relay mobile wireless communications devices may not be so designated in the next TDMA time epoch. In other words, the timing head relay mobile wireless communications devices are rotated through service.

Each time forwarding mobile wireless communications device 20*d*, 20*f*, 20*h*, 20*i* also transmits a respective synchronization message in each TDMA time epoch until, for example, a discrepancy. Additionally, each of the mobile wireless communications devices 20 transmits a respective maintenance message in each TDMA time epoch, irrespective of whether a corresponding synchronization message is transmitted.

Moreover, if the time master wireless communications device 20*a* were to stop transmitting, another one of the mobile wireless communications devices 20 would be selected. Further details of the selection of the time master wireless communications device 20*a* are described below.

Figure 4:
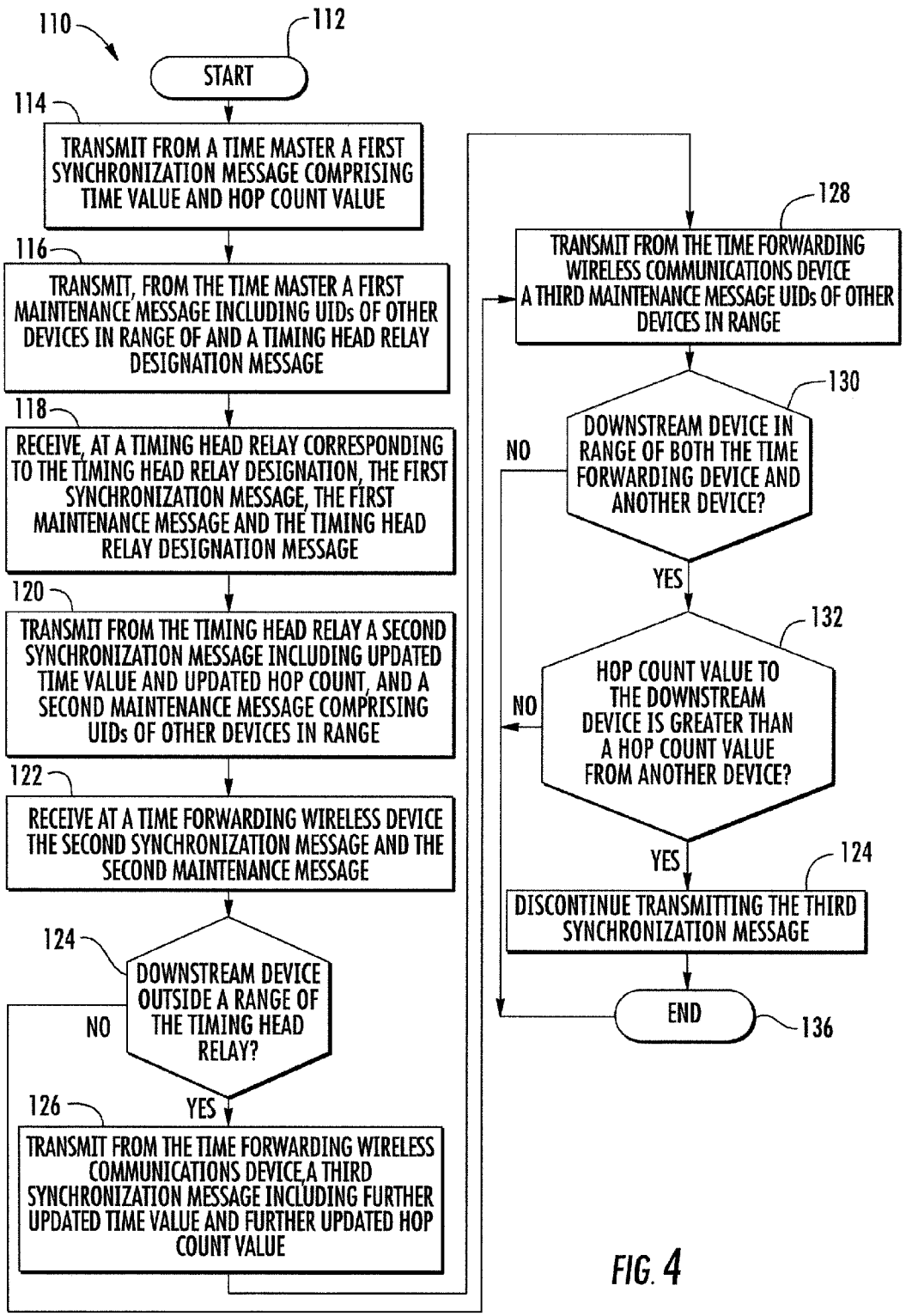
FIG. 4 is a flow chart of a method of wireless communication in accordance with the present invention.

Referring now to the flowchart 110 in FIG. 4, a method aspect is directed to a method of wireless communication in a wireless communications system 10 including wireless communications devices 20 communicating with one another via time division multiple access (TDMA). Beginning at Block 112, the method includes transmitting from a time master wireless communications device 20*a*, from among the plurality of wireless communications devices 20, a first synchronization message including a time value, and a hop count value (Block 114). The method also includes, at Block 116, transmitting, from the time master wireless communications device 20*a*, a first maintenance message including unique identifiers (UIDs) of other wireless communications devices in a range of communications 25*a* from the time master wireless communications device, and a timing head relay designation message.

The method further includes receiving, at a timing head relay wireless communications device, corresponding to the timing head relay designation 20*b*, 20*c* and from among the plurality of wireless communications devices, the first synchronization message, the first maintenance message and the timing head relay designation message (Block 118). The method also includes, transmitting, at Block 120 from the timing head relay wireless communications device 20*b*, 20*c* a second synchronization message including an updated time value and an updated hop count, and a second maintenance message comprising unique identifiers (UIDs) of other wireless communications devices in a range of communications 25*b*, 25*c* from the timing head relay wireless communications device.

The method further includes receiving, at a time forwarding wireless communications device 20*d*-20*f* from among the plurality of mobile wireless communications devices 20, the second synchronization message and the second maintenance message (Block 122). At Block 124, a determination is made as to whether a downstream wireless communications device 20*g* is outside a range of the timing head relay wireless communications device 20*b*, 20*c*. If the downstream wireless communications device (e.g., 20*g*, 20*h*) is outside a range (i.e., 25*d*-25*f*) of the timing head relay wireless communications device 20*b*, 20*c*, the method includes transmitting, from the time forwarding wireless communications device 20*d*-20*f*, a third synchronization message including a further updated time value and a further updated hop count (Block 126). The method also includes, transmitting, at Block 128, from the time forwarding wireless communications device 20*d*-20*f*, a third maintenance message including unique identifiers (UIDs) of other wireless communications devices (e.g., 20*b*, 20*c*, 20*g*, 20*h*) in a range of communications (i.e., 25*d*-25*f*) from the time forwarding wireless communications device.

At Block 130, a determination is made as to whether the downstream wireless communications device is in range (i.e., 25*d*-25*f*) of both the time forwarding wireless communications device 20*d*-20*f* and another wireless communications device (i.e., 25*i*, 25*f*, 25*g*). If the downstream wireless communications device (e.g., 20*g*, 20*h*) is in range of both the time forwarding wireless communications device 20*d*-20*f* and another wireless communications device (i.e., 25*i*, 25*f*, 25*g*), a determination is made, at Block 132, as to whether the hop count value to the downstream wireless communications device (e.g., 20*g*, 20*h*) is greater than a hop count value from the another wireless communications device (i.e., 25*i*, 25*f*, 25*g*) to the downstream wireless communications device. If the downstream wireless communications device is not in range of both the time forwarding wireless communications device and the another wireless communications device, the method ends at Block 136. If the hop count value to the downstream wireless communications device (e.g., 20*g*, 20*h*) is greater than a hop count value from the another wireless communications device (i.e., 25*i*, 25*f*, 25*g*) to the downstream wireless communications device, then the method includes, at Block 134, discontinuing transmitting the third synchronization message. If, the hop count value to the downstream wireless communications device (e.g., 20*g*, 20*h*) is not greater than a hop count value from the another wireless communications device (i.e., 25*i*, 25*f*, 25*g*) to the downstream wireless communications device, the method ends at Block 136.

Further details of the UIDs and how they are used will now be described. As will be appreciated by those skilled in the art, the UIDs may be considered a bit occupancy vector (BOV). To determine the presence of other mobile wireless communications devices within a given group, as well as negotiate mergers and re-elections, each mobile wireless communications device 20 should have an up to date visualization of the current and active group. To complicate creation of such a mapping, VHF communications may experience intermittent moments of hidden nodes throughout the group due to a variety of reasons from signal-to-noise ratio (SNR) to users entering buildings, for example. With this information, the concept of "quick to add, but slow to remove" may be considered the fundamental axiom to the BOV algorithm.

Each mobile wireless communications device 20 includes two BOVs, a global BOV and the local BOV. Each BOV field is a 256 bit field, broken into tour 64 bit fields for ease of mathematical operation and distribution. Of course, another member of bits may be used. The separation of the BOV into separate fields advantageously allows for future expansion to support an increased number of nodes, as will be explained in further detail below.

The local BOV may be considered a bit wise representation of a linked list of mobile wireless communications devices recently heard either by SYNC formatted messages or by NORM formatted messages, as will be described in further detail below. Internal to the linked list is a copy of each station's last transmitted local BOV. The global BOV is a bit wise logical OR operation of all the local stations' local BOVs from the linked list, the local BOV bit field, and the global BOV received over the air throughout the preceding epoch. It should be noted that digital voice (DV) receptions may be considered unstable and possibly invalid, and therefore, not used to update the local or global BOV, nor can a digital video (DV) reception update the internal linked list of the mobile wireless communications devices recently heard.

Initial BOV generation will now be described. When a mobile wireless communications device 20 first switches into an FH-TDMA network, for example, a narrow band networking waveform (NNW) network, the mobile wireless communications device begins to transmit net formation (NF) messages. Upon reaching a Sync Slave state or TM_Elect state, the mobile wireless communications device 20 begins to record other mobile wireless communications devices or stations from which they receive net formation messages belonging to the same TM_Elect. Once the other mobile wireless communications devices 20 or stations move into an operational state, the recorded mobile wireless communications devices form the initial version of the local station linked list known as the "neighborhood." Each time a mobile wireless communications device is added to the neighborhood, the bit corresponding to the MAC address of the mobile wireless communications device is asserted in the local BOV. Each epoch, the global BOV and local BOV are OR-ed together, and the aggregate of this operation is used to modify the receive mode of each slot in the succeeding epoch. If a mobile wireless communications device 20 is present in the neighborhood, the associated slot(s) is converted to a NORM formatted receive slot. However, if the mobile wireless communications device is absent, the associated slot(s) is converted to a SYNC formatted receive slot.

When a mobile wireless communications device changes to the operational state, other mobile wireless communications devices that have not been heard have their slots assigned as SYNC formatted receive slots in the local mobile wireless communications device's epoch layout. When performing the late net entry or Group merger, these "DWELL" slots are capable of receiving the SYNC formatted net formation requests from the missing mobile wireless communications device. This is the mechanism that allows for successful mergers and joining.

An additional process should be performed by the newly appointed time master mobile wireless communications device (TM) upon reaching the operational state. The global BOV is generated from the local BOV logically OR-ed with the local BOV for each mobile wireless communications device in the neighborhood list. The global BOV is then transmitted via the timing head relay designation message for further distribution. Timing head relay designation messages and time forward messages, i.e., the third synchronization messages, will be described in further detail below.

As new mobile wireless communications devices 20 are heard, either using SYNC formatted messages, or NORM messages, individual mobile wireless communications devices add the new mobile wireless communications device(s) to their local neighborhood list and update their local BOV. New mobile wireless communications devices 20 that are not part of the group may use any SYNC formatted message depending on their operational state. For example, the local mobile wireless communications device was not expecting to hear from the outsider mobile wireless communications device in that the user slot was a SYNC formatted receive slot. A new mobile wireless communications device may also use any NORM formatted user or net maintenance message in its user slot. For example, the local mobile wireless communications device did not have the new mobile wireless communications device in the local BOV, but another mobile wireless communications device had informed the local mobile wireless communications device of the presence, and therefore, the global BOV forced the user slot to be a NORM formatted receive slot.

The local BOV in the net maintenance message will now be described. While a group is operational, all nodes within the group will periodically transmit a net maintenance message using their assigned user slot. If there is no user data to be sent during the given slot, the mobile wireless communications device may transmit the entire local BOV in a single complete message. However, when user data is mixed with the net maintenance message, the local BOV is broken into pieces and spread across six epochs. It is this message that mobile wireless communications devices use to update their local neighborhood lists with the 1-hop neighbor mobile wireless communications devices' local BOV information.

The net maintenance message does not transmit any global BOV information. The mobile wireless communications device's global BOV is transmitted in combination with previously received timing head relay designation message or time forward or third synchronization message global BOV information in future timing head relay designation or time forward messages it sends, if requested or required by time forwarding messaging protocols. This segregates the two BOV's to ensure deletion of nodes from the global BOV as mobile wireless communications devices 20 break away from an active group. Since the time master mobile wireless communications device 20a recreates the global BOV every epoch, as mobile wireless communications devices 20 are removed from local BOV's, and thus, removed from the time master mobile wireless communications device's neighborhood list BOV's, the global BOV will eventually remove the missing mobile wireless communications device from the global BOV. This will force the missing mobile wireless communications device to merge with the group if it comes within range once again.

The role of the timing head relay designation message will now be described. The timing head relay designation message has a dual purpose in the wireless communications system 10. First, the timing head relay designation message provides the current time of day with respect to the sending mobile wireless communications device (e.g., the time master mobile wireless communications device 20a). Second, the timing head relay designation message includes a snapshot of a portion of the current global BOV. Depending on the mobile wireless communications device 20, this portion of the BOV may be slightly out of date. The BOV is currently limited to 64 bits for 64 users maximum. Of course, in other implantations another amount of bits may be used. The timing head relay designation message can only support up to 32 bits of BOV information, thus the BOV must be broken up into separate transmissions. In other embodiments additional bits may be supported. This is done via the BOV select field in the timing head relay designation message structure.

Upon initialization of the wireless communications system 10, the number of epochs for transmitting a complete BOV for the user defined maximum number of users is determined. The timing head relay designation message modulus value $MOD_{BOV}$ is determined by the equation below:

$$MOD_{BOV} = \text{ceil}[N_U/32]$$

The $MOD_{BOV}$ is used in conjunction with the epoch count to determine the section of BOV bits transmitting in the timing head relay designation message. At the beginning of each epoch, the current epoch count (number of epochs that have expired since an initial time) modulus the $MOD_{BOV}$ returns the 32 bit offset into the BOV to be transmitted. The offset is assigned to the timing head relay designation message BOV select field to inform the recipient mobile wireless communications device which piece of the BOV is being received. The associated 32 bits of the global BOV are then broken into four 8-bit fields and inserted into the timing head relay designation message.

The last piece of information generated by the time master mobile wireless communications device 20a is the selection of timing head relay mobile wireless communications devices. The time master mobile wireless communications device 20a may select up to two mobile wireless communications devices 20b, 20c to retransmit a timing head relay designation message in the epoch succeeding the epoch in which the timing head relay designation message is transmitted by the time master mobile wireless communications device. A timing head relay mobile wireless communications device 20b, 20c receives the timing head relay designation message from the time master mobile wireless communications device 20a and updates the BOV within the timing head relay mobile wireless communications device before transmitting the message during the following epoch.

The timing head relay mobile wireless communications device 20b, 20c calculates the global BOV much the same way as the time master mobile wireless communications device 20a, by logically OR-ing all local BOV's in the neighborhood list with the local BOV list. Unlike the time master mobile wireless communications device 20a, however, this mobile wireless communications device specific version of the global BOV is further logically OR-ed with the section of the BOV in the timing head relay designation message. The BOV select section of the aggregate BOV is then inserted into the timing head relay designation message to be forwarded by the timing head relay mobile wireless communications device 20b, 20c. By updating the timing head relay designation message section of the global BOV, the timing head relay mobile wireless communications device 20b, 20c allows for a relatively fast addition of mobile wireless communications devices to the group's concept of the global BOV. This allows for the time master mobile wireless communications device 20a to begin looking for NORM user data receptions in user slots the time master mobile wireless communications device has yet to receive from. Thus, when a distant mobile wireless communications device moves into range, a group merger may not need to be performed, as it was brought into the group by a distant mobile wireless communications device, for example.

Unfortunately, the timing head relay designation message "mobile wireless communications device addition process" performance may conflict with the "mobile wireless communications device removal process" performance. Mobile wireless communications devices in a particular mobile wireless communications device's neighborhood list should successfully transmit user data or network information within 5 epochs of a previously successful transmission. Once 5 epochs transpires without receiving any user or network traffic from the mobile wireless communications device, the mobile wireless communications device is dropped from the neighborhood list. Dropping the neighbor includes clearing the local BOV bit representing the mobile wireless communications device, as well as removal of the outstation and associate BOV from the neighborhood list. This removal does not impact the global BOV for the mobile wireless communications device having just removed the mobile wireless communications device from the neighborhood list.

Figure 5:
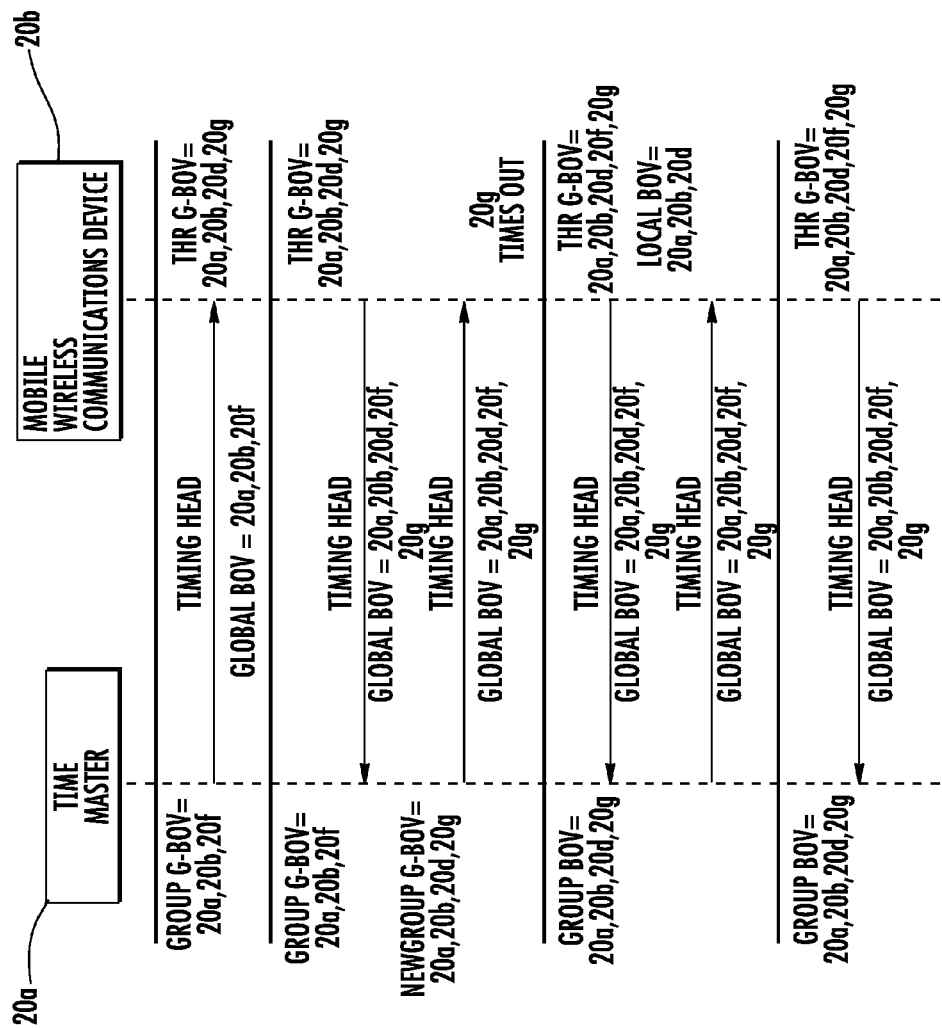
FIG. 5 is a diagram illustrating the effects of failing to clear a global BOV in accordance with the present invention.
Figure 6:
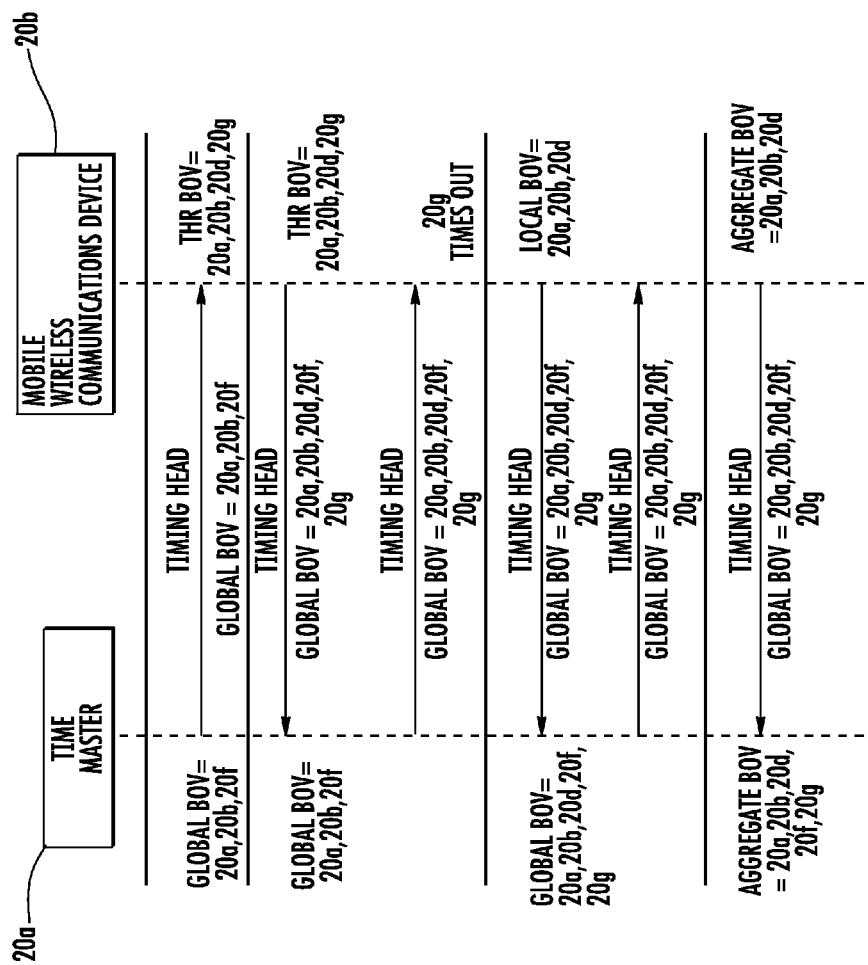
FIG. 6 is a diagram illustrating the effects of clearing the global BOV in accordance with the present invention.

Referring now to FIGS. 5 and 6, the effects of failing to clear the global BOV and clearing the global BOV, respectively, are illustrated. At the beginning of each epoch, the time master mobile wireless communications device 20a recalculates the initial global BOV. If the time master mobile wireless communications device 20a does not clear the initial global BOV field at the beginning of each epoch, a permanent persistence problem is induced.

The time master mobile wireless communications device 20a starts with a local BOV list of 20a, 20b, and 20f present, while mobile wireless communications device 20b begins with a local BOV list of 20a, 20b, 20d, and 20g. The initial timing head relay designation message includes only the radios in the local BOV of the time master mobile wireless communications device 20a. Mobile wireless communications device 20b is selected as a timing head relay mobile wireless communications device, and the succeeding epoch, logically OR's its local BOV into the timing head relay designation message of the BOV to create a group global BOV of 20a, 20b, 20d, 20f, and 20g. Mobile wireless communications device 20b then transmits the timing head relay designation message as a timing head relay mobile wireless communications device, which forces the update of the global BOV stored in the time master mobile wireless communications device 20a.

At the end of the epoch, mobile wireless communications device 20b times' out mobile wireless communications device 20g, as it has not been heard from in over 5 epochs. Now there are no mobile wireless communications devices that have heard from mobile wireless communications device 20g. However, the time master mobile wireless communications device 20a does not start from an all zero global BOV state. Therefore, mobile wireless communications device 20g is still considered in the group even though no other mobile wireless communications device can hear mobile wireless communications device 20g. For the remainder of the group's existence, any mobile wireless communications device that physically leaves the group will still be considered part of the group. This effect of "persistent Global BOV" information will negate the benefits of group mergers and separations.

By clearing the global BOV in the time master mobile wireless communications device 20a at the beginning of each epoch, only the neighborhood list local BOV's and the local BOV of the time master mobile wireless communications device 20a create the next epochs global BOV to be transmitted via the timing head relay designation message.

The algorithm for selection of the timing head relay mobile wireless communications device 20b, 20c will now be described. When selecting the next epoch's timing head relay mobile wireless communications devices, the time master mobile wireless communications device 20a must take into account connectivity sets amongst the radios in its neighborhood list. The time master mobile wireless communications device 20a first selects one of the mobile wireless communications devices in the local BOV. Current implementations include a round robin selection, while future implementations may desire a more efficient vector analysis method of selection.

If there are no local mobile wireless communications devices 20, the time master mobile wireless communications device 20a fills in the timing head relay fields with 0's, which implies no timing head relay mobile wireless communications device 20b, 20c is available. If there is only one local station, then the time master mobile wireless communications device 20a will continually pick the single local mobile wireless communications device (e.g. 20b or 20c) as the timing head relay mobile wireless communications device. The time master mobile wireless communications device 20a will skip the second timing head relay selection portion of the algorithm.

If there is more than one mobile wireless communications device 20 in the local neighborhood list, and the time master mobile wireless communications device 20a has picked the first timing head relay mobile wireless communications device 20b, 20c, the time master mobile wireless communications device attempts to find the mobile wireless communications device in the neighborhood list that has the most orthogonal occupancy vector. Each mobile wireless communications device 20 in the neighborhood list (excluding the mobile wireless communications device selected as the first timing head relay mobile wireless communications device) has its local BOV logically XOR-ed with the first local BOV of the first timing head relay mobile wireless communications device. This operation is expressed as:

$$Orth = count[BOV_{THR1} \oplus Radio_X]$$

if (Orth≥Last).

... Last=Orth

... THR2=x

The time master mobile wireless communications device 20a loops through the above equation for all mobile wireless communications devices in the local neighborhood list until the station with the most orthogonal BOV is located.

Figure 7:
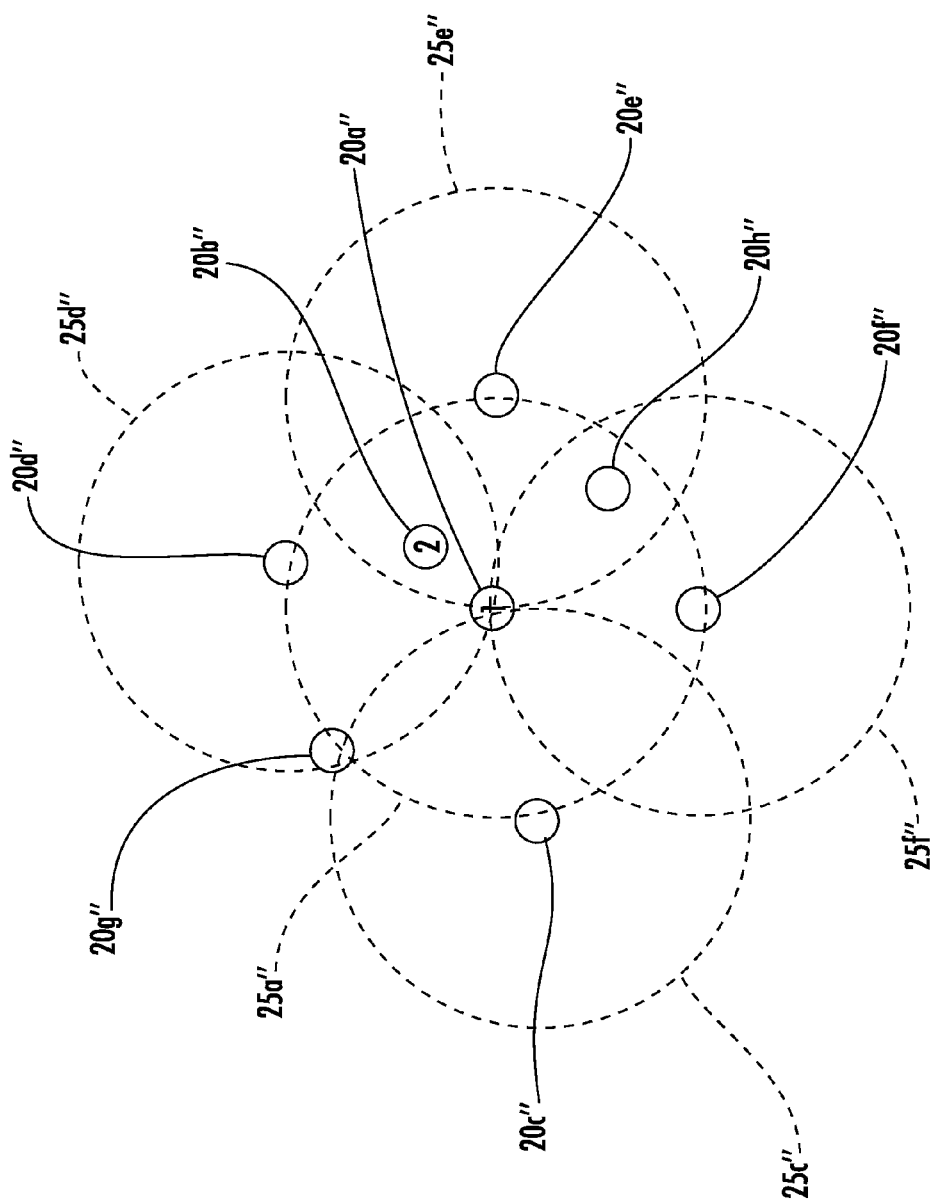
FIG. 7 is a diagram illustrating mobile wireless communications device group members' spheres of influence according to an embodiment of the present invention.

Referring now additionally to FIG. 7, the mobile wireless communications device group numbers' spheres of influence are illustrated. The first hop sphere of influence of the time master mobile wireless communications device 20a" is shown by the line 25a". All mobile wireless communications devices 20" within the confines of the first hop 25a" can communicate directly with the time master mobile wireless communications device 20a", but do not necessarily communicate with each other. These mobile wireless communications devices are considered to exist at the hop=1 boundary, and therefore are found in the neighborhood list of the time master mobile wireless communications device 20a". When calculating which mobile wireless communications devices will be the next two timing head relay mobile wireless communications devices, the maximum orthogonal BOV calculations described provides the mathematical representation of graphs such as those illustrated in FIG. 7.

In this example, if mobile wireless communications device 20c" was picked as a timing head relay mobile wireless communications device, mobile wireless communications device 20e" would be picked as the other timing head relay mobile wireless communications device. Also, if mobile wireless communications device 20d" was picked as a timing head relay mobile wireless communications device, the corresponding secondary timing head relay mobile wireless communications device would be mobile wireless communications device 20f".

This example only shows mobile wireless communications devices within direct influence of the time master mobile wireless communications device 20a". Additional mobile wireless communications devices 20" may exist outside of the global BOV since a direct connect mobile wireless communications device has not had a chance to update its local BOV information to the time master mobile wireless communications'device 20a".

Figure 8:
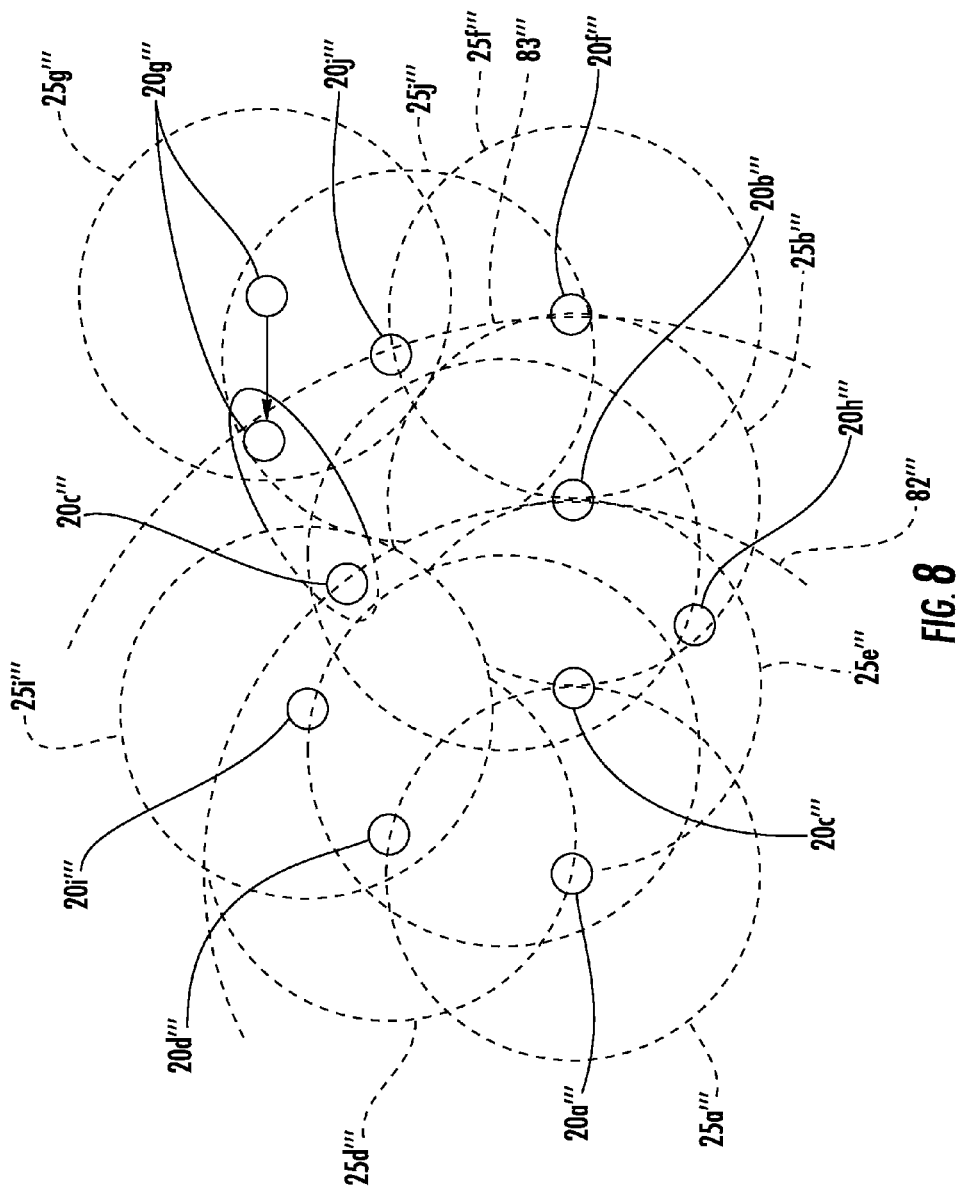
FIG. 8 a schematic diagram illustrating time forward spheres of influence according to an embodiment of the present invention.

Referring now additionally to FIG. 8, the role of the time forward self selection will now be described. The third synchronization message or time forward (TF) message is used to time synchronize mobile wireless communications devices outside of the direct sphere of influence 25a''' of the time master mobile wireless communications device 20a'''.

For the purpose of this description, there are three concentric "hop" circles 25a''', 82''', 83''' radiating from the time master mobile wireless communications device 20a'''. Unfortunately, each mobile wireless communications device 20''' has approximately an identical single hop sphere of influence or wireless communications range 25'''. Therefore, there are locations along the hop=2 communications range 82''' or sphere in which a mobile wireless communications device 20''' may exist that it cannot hear a timing head relay designation message from a mobile wireless communications device within direct influence of the time master mobile wireless communications device 20a'''. For demonstration purposes, the rest of this section will reference mobile wireless communications device 20c''' as the "hidden mobile wireless communications device."

Other mobile wireless communications devices 20''' may be able to communicate with this "hidden mobile wireless communications device", but eventually, this mobile wireless communications device will timeout the time master mobile wireless communications device 20a''' and perform a time master mobile wireless communications device re-election. Therefore, mobile wireless communications device 20''' transmits a time master mobile wireless communications device re-election even though the time master mobile wireless communications device 20a''' is present and actively providing time. As part of the rules for re-elections, once a re-elect is heard, a mobile wireless communications device must forward the re-election to the rest of the group. Re-elections occupy user slots, and therefore can cease user data from seven epochs before a new time master mobile wireless communications device is elected. Typically, the same time master mobile wireless communications device will be re-elected, so after another nine epochs of not hearing from the time master mobile wireless communications device 20a''', the re-election process will restart.

This repeated pattern of re-elections may be an inherent "denial of service" bug within the original protocol. Therefore, the time forward message was added to address this issue and maintain a network with less fluctuation and user data down time.

The time forward message is a self appointed transmission that occurs every epoch based upon received timing head relay designation messages and local BOV connectivity versus neighbor's connectivity. If a mobile wireless communications device can hear the time master mobile wireless communications device 20a''' directly, it automatically removes itself as a possible candidate for time forward transmissions.

To determine if any mobile wireless communications devices exist within the local BOV that cannot hear the time master mobile wireless communications device 20a''', timing head relay designation message, or time forward message, the local mobile wireless communications device traverses the neighborhood list for any mobile wireless communications devices from whom it has received a timing head relay designation or time forward message. Each mobile wireless communications device 20''' that has transmitted a timing head relay designation or time forward message in the previous epoch has its respective BOV bit asserted in a special correlation BOV. The correlation BOV is then used to compare against each neighborhood mobile wireless communications device's BOV using the logical AND function. While traversing the neighborhood list, any mobile wireless communications device's local BOV AND-ed with the correlation BOV resulting in a 0 cannot hear any time source. This gives impetus to the local mobile wireless communications device transmitting a time forward message.

Finally, after proving the first two conditions are satisfied, a time-to-live value is checked. Each time a timing head relay designation message is received directly from a time master mobile wireless communications device 20a''', it knows that its hop distance is at hop 1. If the mobile wireless communications device 20''' receives a timing head relay designation message from a timing head relay mobile wireless communications device, but not the time master mobile wireless communications device 20a''', the mobile wireless communications device 20''' knows it is at hop 82'''. These hop values are used as the incrementing TTL value in the time forward message. A mobile wireless communications device 20''' can only transmit a time forward message provided its hop value is greater than 1, but less than any other TTL value in any received time forward message.

Time forward messages are transmitted in randomly select network slots. Since there are predefined or hardcoded number of slots throughout an epoch, there is a probability that a time head relay designation message may be transmitted at the same time causing a collision. By gating transmissions based on an incrementing TTL value, the number of transmitting mobile wireless communications devices is reduced, and allows for a relatively quick recovery of timing head relay designation messages.

In the example illustrated in FIG. 8, mobile wireless communications device 20a''' transmits a timing head relay designation message in the first epoch. In the second epoch, mobile wireless communications devices 20d''' and 20e''' transmit timing head relay designation messages as they were selected as the timing head relay mobile wireless communications devices. In the third epoch, mobile wireless communications device 20h''' knows that mobile wireless communications device 20b''' can hear mobile wireless communications device 20e''' due to its local BOV as reported by a net maintenance message. Therefore, mobile wireless communications device 20h''' does not meet the special correlation BOV requirement. However, mobile wireless communications device 20b''' can hear mobile wireless communications device 20f''', which neither mobile wireless communications device 20h''' nor mobile wireless communications device 20e''' can hear. This is also true of mobile wireless communications device 20c''' only being able to hear mobile wireless communications device 20i'''. Therefore, in the third epoch, mobile wireless communications devices 20i''' and 20b''' will both transmit a time forward message using a hop count of 3.

This process is repeated every epoch. Mobile wireless communications device 20c''' has a hop count of 4, but may never transmit a time forward message as it does not include an outside mobile wireless communications device in its local BOV that cannot hear mobile wireless communications device 20i'''. However, with the mobile wireless communications device 20e''' tree, mobile wireless communications devices 20f''' and 20j''' also transmit time forward messages with hop counts of 4 and 5 respectively. Mobile wireless communications device 20g''' holds a hop count of 6, but may never transmit a time forward message as it does not have an outstation in its local BOV, just as mobile wireless communications device 20c'''.

Assuming that mobile wireless communications device 20g''' were to move as illustrated such that its sphere of influence includes both mobile wireless communications device 20c''' and mobile wireless communications device 20j''', but 20c''' and 20j''' still cannot hear one another. The epoch that mobile wireless communications device 20g''' and mobile wireless communications device radio 20c''' add each other to their local BOV's they now both have an outstation that does not receive timing head relay designation or time forward messages from their respective chains. Therefore, the succeeding epoch, both mobile wireless communications devices will transmit their time forward messages, mobile wireless communications device 20c''' using a hop count of 4 and mobile wireless communications device 20g''' using a hop count of 6. At the end of the epoch, mobile wireless communications device 20c''' now includes a mobile wireless communications device that is considered an outstation to its current time chain, and mobile wireless communications device 20c''' has a lower hop count than the outstation. Therefore, mobile wireless communications device 20c''' will continue to transmit time forward messages for mobile wireless communications device 20g''' to synchronize its time. However, mobile wireless communications device 20g''' finds that it has a hop count greater than mobile wireless communications device 20c'''. Mobile wireless communications device 20g''', therefore, does not transmit a time forward message in the succeeding epoch.

At the beginning of the next epoch, mobile wireless communications device 20c''' determines it needs to continue transmitting time forward messages. Mobile wireless communications device 20g''' will have received a time forward message from mobile wireless communications device 20c''' with a hop count of 4 as well as a time forward message from mobile wireless communications device 20j''' with a hop count of 5. Therefore, mobile wireless communications device 20g''' determines that it should send a time forward message for mobile wireless communications device 20j''', as will mobile wireless communications device 20j''' continue to transmit time forward messages. The next epoch finds both mobile wireless communications device 20g''' and mobile wireless communications device 20j''' transmitting time forward messages with an identical hop count of 5 to each other. Since the hop count's are now equal, every other epoch, neither mobile wireless communications device transmits a time forward message is transmitted with equal hop count, and in the other epochs, a time forward message to identical hop counts. This keeps the mobile wireless communications devices furthest away from the time master mobile wireless communications device 20a''' in time synchronization with the rest of the network and ready to communicate should they move towards the time master mobile wireless communications device.

The pseudo-random nature of the time forward message allows for collisions between the timing head relay designation and time forward messages at the hop=1 mobile wireless communications device. This collision is fairly benign in that the lost timing head relay designation message reoccurs within two epochs of the initial collision. This is a short enough period to reduce dropping mobile wireless communications devices 20''' from the local BOV of any mobile wireless communications device.

Figure 9:
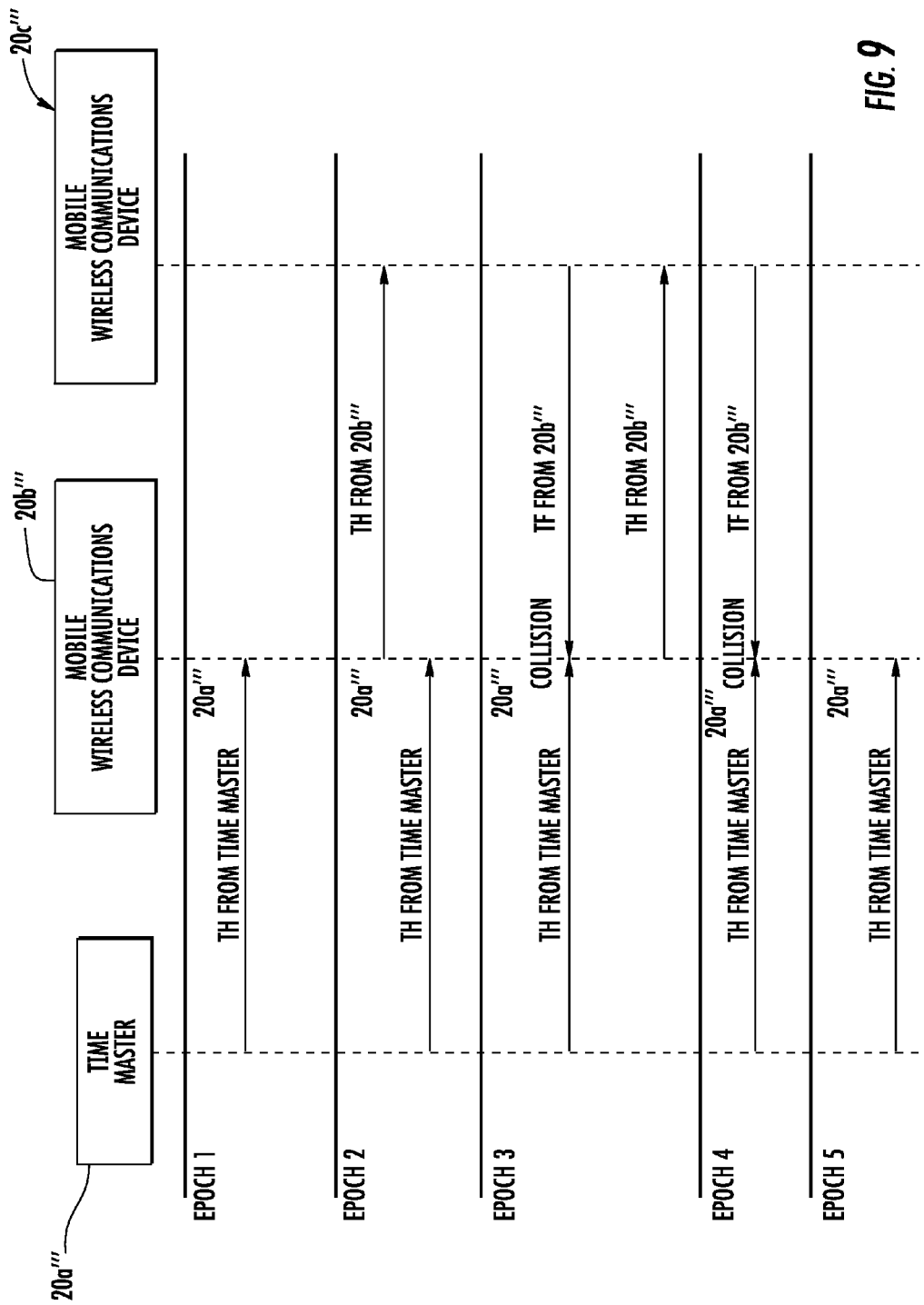
FIG. 9 a diagram illustrating the time forward self healing collision process according to an embodiment of the present invention.

Referring now to FIG. 9, a diagram illustrating the time forward self-healing collision process is illustrated. More particularly, a sequence diagram of a timing head relay designation message and time forward message collision and self-healing process is illustrated. In this scenario, it is assumed that mobile wireless communications device 20c''' hears an additional mobile wireless communications device that is not shown in the diagram, but is receiving any time forward messages from mobile wireless communications device 20c'''. In this scenario, the time master mobile wireless communications device transmits a timing head relay designation message in epoch 1, naming mobile wireless communications device 20b''' as a timing head relay mobile wireless communications device. In epoch 2, the time master mobile wireless communications device 20a''' again transmits a timing head relay designation message, but mobile wireless communications device 20b''' also transmits a timing head relay designation message based on the message received in epoch 1.

At the beginning of epoch 3, mobile wireless communications device 20c''' determines it is to forward the time to another station (not shown). Therefore, mobile wireless communications device 200''' randomly picks a network slot in which it transmits the time forward message. Unfortunately, the time master mobile wireless communications device 20a''' has picked the same slot, and both messages collide at mobile wireless communications device 20b''', resulting in a failed reception. However, mobile wireless communications device 20b''' still has information pertaining to the timing head relay designation message from epoch 2, which again selected mobile wireless communications device 20b''' as a timing head relay mobile wireless communications device. Therefore, in epoch 3 mobile wireless communications device 20b''' again transmits a timing head relay designation message.

For the purposes of a potential worst case scenario, a second collision occurs between mobile wireless communications device 20c''' and mobile wireless communications device 20a'''. Again, mobile wireless communications device 20a''' as the time master mobile wireless communications device must send a timing head relay designation message. This time, mobile wireless communications device 20c''' randomly picks the same networking slot as the time master mobile wireless communications device for a second time. This collision now has mobile wireless communications device 20b''' missing transmissions from the time master mobile wireless communications device 20a''' for the last two epochs. However, since mobile wireless communications device 20b''' did not receive a timing head relay designation message from the time master mobile wireless communications device 20a''' in epoch 3, at the end of epoch 4, mobile wireless communications device 20c''' has not received any timing head relay designation messages. Therefore, epoch 5 will include a message from the time master mobile wireless communications device 20a''', and the process can begin all over again.

The Neighbors Indirect Acknowledgement Algorithm (NbIA), which, as an internal state machine will now be described. The NbIA finite state machine used in the narrowband networking waveform (NNW) differs slightly from the one presented in the NbIA protocol specification, which is discussed in U.S. Pat. No. 7,768,992, which is assigned to the present assignee and the entire contents of which are herein incorporated by reference. The changes to the protocol begin with relatively simple concepts, such as, for example, the start of an epoch, and extend to minor transitional changes within the finite stat machine (FSM) diagram.

Each epoch has a static layout in terms of slot type and slot assignment. According to the NbIA protocol specification, the start of a "Network Epoch," in terms of timing calculations, is based on the start of the $0^{th}$ slot. However, the FSM performs decisions and transitions based on the "local start of epoch" for the mobile wireless communications device. The "local start of epoch" is defined as the start of the NORM slot the mobile wireless communications device 20 uses for data transmission, unless the mobile wireless communications device is a time master mobile wireless communications device or a timing head relay mobile wireless communications device, in which case the SYNC slot the time master mobile wireless communications device/timing head relay mobile wireless communications device is to transmit its networking SYNC message is the start of the next epoch.

The previously described approach is sound in theory and provides for timely decision making on the part of each mobile wireless communications device throughout any network epoch period. Furthermore, this approach may reduce any delay reaction that may result from receptions that normally occur after the transmit slot of the local mobile wireless communications device 20.

The previously described approach also has some negative points that have encouraged the transformation of the original approach to the one described herein. All mobile wireless communications devices 20 generally maintain a common "start of epoch" regardless if the start is a "network epoch" or "local epoch." This approach provides a number of advantages as well as some disadvantages. By aligning mobile wireless communications devices 20 to a single start of epoch, debugging a real time execution of multiple mobile wireless communications devices as well as a simulated environment may provide a common reference point.

Furthermore, the math for synchronization may be reduced. More importantly, with the timing head relay mobile wireless communications devices 20b, 20c receiving their new SYNC slot location in the previous epoch from a time master mobile wireless communications device 20a, there may be no safe and consistent way for a timing head relay mobile wireless communications device to calculate a valid start of epoch reference. This may reduce the complexity significantly. The primary disadvantage noticed at this point is the possibility of not accounting for the message from the last mobile wireless communications device in a mobile wireless communications system or network.

Since all mobile wireless communications devices generally have a priori knowledge of the network layout, they may be aware of the last mobile wireless communications device possibly occupying the last slot. Since the mobile wireless communications device may not be able to process the received information in time for the $0^{th}$ slot, the information from the last mobile wireless communications device typically does not impact the decision of the NbIA FSM until the following epoch. This may cause upwards of ½ an average network latency with respect to network creation and re-election. Since the first slot is a SYNC slot, it is suggested that the NbIA FSM not make a final decision about general operation until the midpoint of the $0^{th}$ slot, unless the mobile wireless communications device is the time master mobile wireless communications device and has pseudo randomly selected the $0^{th}$ slot (since it is a SYNC slot) as the slot may transmit the next epoch's timing head relay designation message.

The FSM is a Mealy FSM wherein event/action pairs occur when transitioning from one state to another. It is generally desirable that NbIA actions occur at discrete and synchronized intervals, after the new state has been transitioned to, based on the priority of messages that have been received throughout the previous epoch. Therefore, each transition line uses the following format:

X) $E_Y A_Z$—where

X=Priority of check applied and lowest number has highest priority

E=Event for action

Y=Event Identifier from the Events Table

A=Action prescribed to occur based upon events

Z=Action Identifier from the Action Table.

It should be noted that commas between events or actions implies a logical. AND of events or actions.

Parenthesis implies a logical grouping of events or actions. The word OR implies the inclusively "or" of either multiple events or actions. The "/" character in front of an event represents the logical NOT operation, as in the event did not occur in the previous epoch.

e.g. 2) $(/E_K, E_M)$ or $E_L$-->$A_F, A_G$

This may be interpreted as:

The second priority check in the "Nested IF" code within this state;

---

IF ( ( ( NOT Event K ) AND Event M ) OR ( Event L ) )
    THEN
        Execute Action F AND Action G.

---

It should be noted that special characters such as * and + are used in the SLAVE_OPERATIONAL state. These characters affect the logical sequence in which the conditions are checked. The explanation of these characters will be provided in further detail below. Moreover, events accumulate throughout the epoch and cause the state change. The new state is used in the formatting of any messages derived from prescribed actions. Regardless of the state, any time a mobile wireless communications device receives any type of message from another mobile wireless communications device, the local BOV is updated.

Each mobile wireless communications device stores the most desirable MAC ID, from net formation (NF) and time master re-election messages, each epoch for future net formation and time master re-election transmissions. Table 1 below is an exemplary NbIA event list, and table 2 is an exemplary NbIA action list.

TABLE 1

| Event | Event Description |
|---|---|
| A | Epoch Tick and nothing happened (No pertinent NbIA messages RX'ed) |
| B | GPS Achieved with no Significant time change |
| C | GPS Achieved with significant time change |
| D | GPS Unavailable |
| E | GPS counter = 1 |
| F | RX Timing Head Relay (Sender is the TM already) |
| G | RX Net Formation (Sender = TM Elect, Sync Slave for Local TM) |
| H | RX Net Formation (Sender = Don't Care state, Other TM is better) |
| I | RX Timing Head (Message directed to my local group) |
| J | SwitchToNorm counter = 1 |
| K | TMConnectivity counter = 1 |

TABLE 1-continued

| Event | Event Description |
|---|---|
| L | FastTrack Mode ENABLED |
| M | MAC ID is 1 |
| N | RX Timing Head (Sender is Other TM or THR and better) |
| O | RX Timing Head (Sender is Other TM or THR and not better) |
| P | RX Group Information in NORM as NORM (GRP = Other and better) |
| Q | RX Group Information in NORM as SYNC (GRP = Other and better) |
| R | RX Group Information in NORM as NORM (GRP = Local TM with new Time) |
| S | RX TM ReElection |
| T | TMReElectionEpoch counter = 1 |
| U | TM ReElection Winner is My MAC ID |
| V | TM ReElection Winner is Other MAC ID |
| W | Group Sync'ed to System Time (Not GPS) |
| X | Selected as Timing Head Relay for next Epoch |
| Y | No Timing Head messages received |
| Z | My ID not present in Global BOV in THR |
| AA | TM sent GI Message due to GPS time change |
| BB | SLAVE radio needs to adjust time |
| CC | Received Time Forward Message (For Local TM) |

TABLE 2

| Action | Action Description |
|---|---|
| A | Align Epoch to System Time |
| B | Reset GPS Counter = (15 sec/$T_E$) |
| C | Decrement GPS Counter |
| D | Align Epoch to GPS Time |
| E | Align Epoch to Net Formation Message (delay 1 epoch when Non-OPER) |
| F | Align Epoch to Timing Head Message (delay 1 epoch when Non-OPER) |
| G | Set SwitchToNorm Counter = 2 (TM Elect going OP or, node switching TMs) |
| H | Set SwitchToNorm Counter = 3 (Slave only) |
| I | Set TMConnectivity Counter = 9 |
| J | Decrement SwitchToNorm Counter |
| K | Decrement TMConnectivity Counter |
| L | TX Net Formation (GRP = My MAC ID) in NORM as SYNC |
| M | TX Net Formation (GRP = best TM) in NORM as SYNC |
| N | TX Net Maintenance in NORM as NORM |
| O | TX Timing Head in SYNC of next epoch (adjust TH Message) |
| P | TX Group Information (GRP = Local) in NORM as SYNC |
| Q | TX Group Information (GRP = Other) in NORM as NORM |
| R | TX Group Information (new Time) in NORM as NORM |
| S | Align Epoch to new Group from Group Information Msg |
| T | Set TMReElectionEpoch Counter = 7 (2 in special cases) |
| U | TX TM ReElection in NORM as NORM |
| V | Decrement TMReElectionEpoch Counter |
| W | Allow NORM message to be transmitted (* Alternate SO State is checked) |
| X | Do not allow NORM messages to be transmitted |
| Y | Transmit Time Forward Message |

Group formation will now be described. Prior to any exchange of information between any set within a group, each mobile wireless communications device determines the status of its global positioning system (GPS) or internal clock. The WAIT_GPS state allows for up to six epochs to expire prior to moving a mobile wireless communications device into the advanced states of operation. If a mobile wireless communications device determines that the GPS is disabled, the mobile wireless communications device may immediately move into the TM_ELECT state using the system clock as the time source. However, if the mobile wireless communications device determines the GPS is present, the mobile wireless communications device may wait the maximum number of epochs for the GPS to provide a time that is both from a tracking state (4 or more GPS satellites) and stable (even increments of 1 seconds between messages).

If the GPS does not provide a stable time, the mobile wireless communications device transitions to the TM_ELECT state once the GPS counter has expired. In this case, the system clock is again used as the time source for the mobile wireless communications device's epoch layout. However, if the GPS provides a tracking and stable time, the mobile wireless communications device may transition to the TM_ELECT state prior to the expiration of the GPS counter.

In the event that the GPS is capable of providing a stable time, the MAC ID of the mobile wireless communications device is 1, and the fast track feature is enabled. The mobile wireless communications device in question may transition from the WAIT_GPS state to the TM_OPERATIONAL state. This is the method of supporting the fast track feature in which the user may define a mobile wireless communications device to be favored as the future time manager on power up. The fast track feature makes the selection of the mobile wireless communications device MAC ID of 1 the favored time manager, but does not guarantee the selection of that mobile wireless communications device in every instance.

Another stimulus to the WAIT_GPS state is the reception of net formation (NF) or timing head relay designation message. When either message is received from another mobile wireless communications device proposing itself or another mobile wireless communications device that is a more suitable time manager or time master mobile wireless communications device, the mobile wireless communications device will forgo the remaining epochs in the WAIT_GPS state and move immediately to the SYNC_SLAVE state.

When a mobile wireless communications device enters in the TM_ELECT state, the mobile wireless communications device assumes that it is the best mobile wireless communications device for the distribution of time to the local group. Since this is not always the case, a mobile wireless communications device may transition from the TM_ELECT state to the SYNC_SLAVE state by simply receiving a timing head relay designation message or NF message from another mobile wireless communications device that proposed a better time master mobile wireless communications device. This may be the highest priority check at the end of an epoch, as if a better source is found, no changes should be made to the current epoch layout or time alignment until the mobile wireless communications device has changed states.

The TM ELECT state lasts for two epochs. This may provide sufficient time to determine if the local mobile wireless communications device is the best candidate for the time master mobile wireless communications device, as well as notification to other mobile wireless communications devices of the mobile wireless communications device's presence and intention to become the time master mobile wireless communications device. The NF and timing head relay designation message transmitted during this state allows other mobile wireless communications devices to determine if they chose the transmitting station to become the time master mobile wireless communications device as well as make a time alignment shift to that of the proposed time master mobile wireless communications device. The NF messages also serve the alternate purpose of building the initial local BOV for each mobile wireless communications device prior to the narrowband networking waveform (NNW) entering an OPERATIONAL state.

The SYNC_SLAVE state is designed to perform three major functions: select and propagate the best time master mobile wireless communications device to other mobile wireless communications devices within RF and time range of the local mobile wireless communications device, build up the local BOV, and align the time base of the mobile wireless communications device to the time base of the selected time master mobile wireless communications device.

Since a time master mobile wireless communications device transitioning to a SYNC slave may not become part of the local BOV of a different time master mobile wireless communications device or its associated outstation immediately, the SYNC_SLAVE state affords a mobile wireless communications device three epochs to transmit a NF message to notify other mobile wireless communications device of its presence. This also delays the transition from an all SYNC slot epoch to an operational epoch. By maintaining the SYNC slot layout, the mobile wireless communications device is more likely to receive NF and timing head relay designation messages from other mobile wireless communications devices within the time offset limits.

If throughout the lifetime of the SYNC_SLAVE state a mobile wireless communications device determines that there is a better time master mobile wireless communications device to follow than the one currently being tracked, the mobile wireless communications device will reset the OPERATIONAL counter, and begin transmitting NF messages with the new proposed time master mobile wireless communications device. However, unlike the initial entry into the SYNC_SLAVE state, changing proposed time master mobile wireless communications devices only allows the mobile wireless communications device two epochs prior to transitioning to an OPERATIONAL mode.

Once a final time master mobile wireless communications device is selected and the OPERATIONAL counter expires, the mobile wireless communications device transitions to the SLAVE_OPERATIONAL mode. The settling of the time master mobile wireless communications device selection does not indicate that a final time master mobile wireless communications device has been selected, but rather that a time master mobile wireless communications device has been selected within the limits of the OPERATIONAL counter expiration. There still exists a possibility that another mobile wireless communications device is a better time master mobile wireless communications device and has yet to be acknowledged. In this case, the use of group mergers or re-elections may provide the appropriate mechanisms to address any further contention while still presenting the user an active network.

Once a mobile wireless communications device has transitioned from the TM_ELECT to TM_OPERATIONAL or from SYNC_SLAVE to SLAVE_OPERATIONAL, the mobile wireless communications device has entered an OPERATIONAL state and the user may proceed to pass data as well as digital voice (assuming the network supports DV). At this point, the timing head relay time forwarding features described above are available for synchronization of the mobile wireless communications network.

Figure 10:
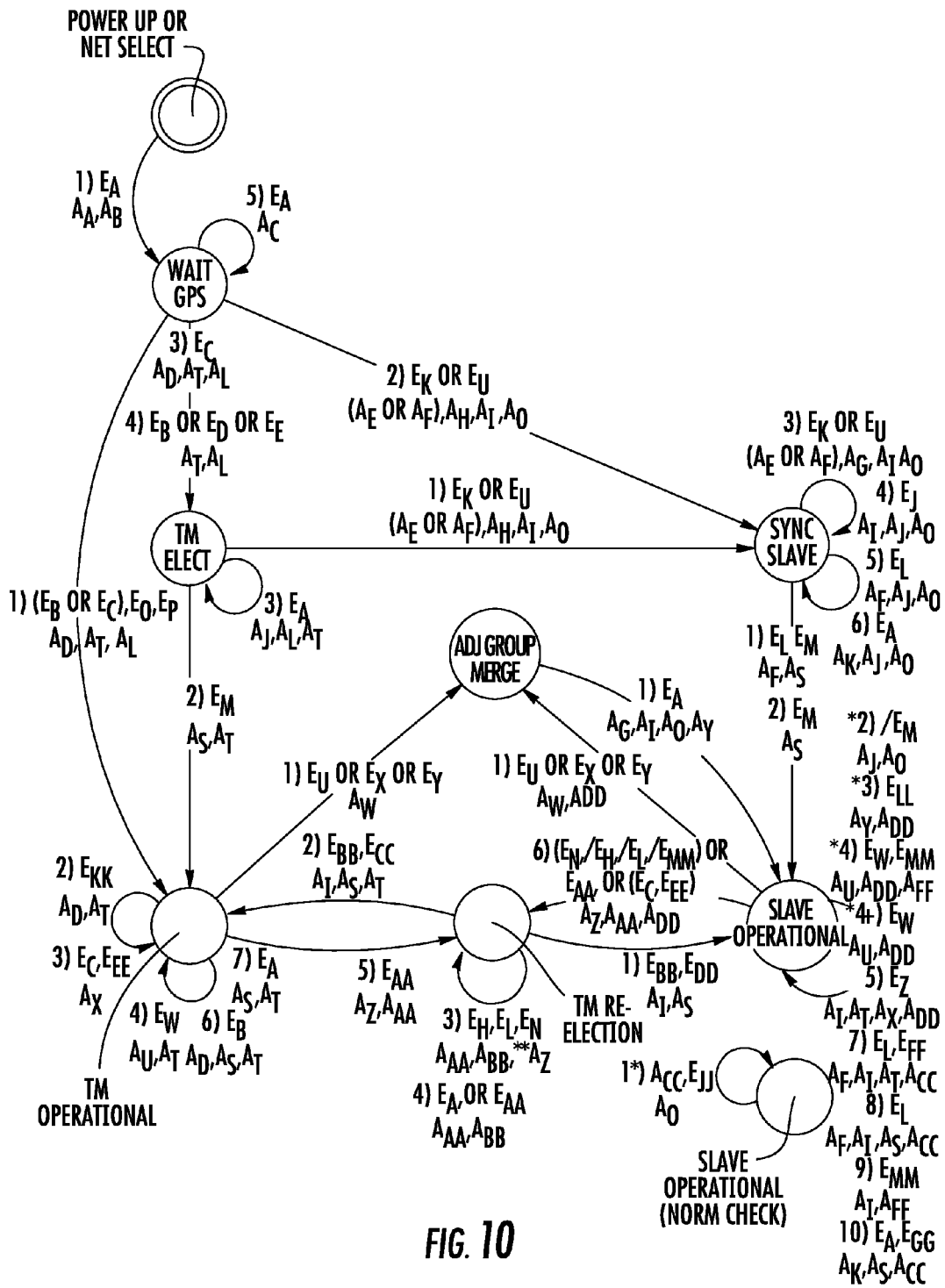
FIG. 10 is a state diagram of the NbIA Mealy Finite state machine in accordance with the present invention.

The SLAVE_OPERATIONAL mode is where a majority of the processing occurs for the members of a group. Referring additionally to the state diagram 90 in FIG. 10, this state is described in an unconventional manner. Typically, in a Mealy based FSM design, a state has a number of events that may have occurred, for each of which there is an action that must take place. However, in a TDMA network FSM, in which a slave node may have multiple functions to perform each epoch, the selection of the functions may impact the selection of additional duties for the same future epoch. A mobile wireless communications device is normally assigned a single user slot to perform user data transfers as well as network maintenance transfers. However, this user slot may be converted to a SYNC slot for scenarios such as group mergers or used as a NORM slot for time shift messages using the group Information messages.

Furthermore, a node may also be assigned the position of a timing head relay mobile wireless communications device or a time forwarding wireless communications device in which additional responsibility must be assigned in network slots. To determine the appropriate combination and utilization of these slots becomes a complex conditional control structure. It is this behavior may complicate the SLAVE_OPERATIONAL state, almost to the point of there being a state within a state effect.

The highest priority check that should be performed in the SLAVE_OPERATIONAL state is that of the adjacent group merger. If the mobile wireless communications device determines that there is a better group co-located to its current group, the slave mobile wireless communications device transitions to the ADJ_GROUP_MERGE state in the succeeding epoch. All previous notions of net maintenance or timing for the old group may no longer apply to the node, except for the group information (GI) message, as the node may be responsible for sending prior to leaving the current group. Therefore, all follow-on logical checks are passed over. This may be the only condition that bypasses all other checks in the current state of operation.

Conditional checks 2-4 are segregated from checks 5-10 in that they center on the results of a group merger process or time shift. Check 2 is used to ensure group merger completion. When a mobile wireless communications device is moving into another group, the other group may not have successfully received the request to join. Therefore, when transitioning from the ADJ_GROUP_MERGE state, the mobile wireless communications device not only changes the group ID, but transmits net formation (NF) messages in its user slot but in a SYNC format. This allows the gaining group to recognize and add the new node to their BOV. To ensure the merger completes, the node in question resets the switch to normal counter, allowing for two additional epochs of net formation messages. Once the counter expires, the mobile wireless communications device gets full operational functionalities as a member of the group.

When a mobile wireless communications device has received a GI message in a fellow group member NORM slot, this is the result of either a general time shift for the group, or the members are changing group membership. In the case of a general time shift, the mobile wireless communications device does not have to go through the ADJ_GROUP_MERGE state; however, the ToD at the end of the current epoch is not necessarily the same ToD at the beginning of the succeeding epoch. There may be no way that changing time lines allow a complete epoch to occur after the epoch boundary has been reached. Therefore, check 5 is designed to handle the reception of a NORM GI message for retransmission in the succeeding epoch, but with this action, a flag is set for the next epoch to handle the time shift. Therefore, check 3 delays any actions other than the time shift to occur for the epoch following the transmission of a NORM GI message. This check informs the engine that a ToD shift is to be applied at the end of the epoch, and no other message may be sourced from the local node, as it may be missed due to the possibility that the succeeding epoch does not include the predetermined slot.

Check 4 has two purposes, first to allow for a pulling in of an outsider node into the local group, and second to allow for time forwarding when desired. Check 4 is broken into two halves denoted by the *4 and *4+ events. When a timing head relay designation message from a foreign group is received, and the local time master mobile wireless communications device is a better time master mobile wireless communications device, the mobile wireless communications device in question determines that it is better for the local mobile wireless communications device to pull in the other group, rather than for the local group to merge into the foreign group. Therefore, in check 4, the mobile wireless communications device attempts to send a SYNC based GI in the NORM slot in an attempt to draw in the other group.

If the other group does not merge right away, allowing the local mobile wireless communications device to continually transmit NORM GI messages, the local user may be deprived of any user bandwidth. Therefore, a merger counter is introduced to delay SYNC GI message transmission. A SYNC GI message is allowed once every five epochs. This ensures that some stability is reached over time before attempting to slam the foreign node with multiple SYNC GI messages. If the merger counter expires, and there still appears to be a foreign mobile wireless communications device looking to be pulled into the local group, transition 4 is taken. As an added option, when transition 4 is taken, the local mobile wireless communications device also checks to see if it can send a time forward message as an alternate to pulling in the foreign mobile wireless communications device. This may be desirable as the user slot of the local mobile wireless communications device may align with the voice or user data slots of the foreign mobile wireless communications device and never be heard.

For the previous conditional checks described (checks 2-4), the final NORM check, as denoted by the "1*" symbology, may not be allowed to occur. This is because the final check determines if the local mobile wireless communications device can use its NORM slot for a net formation message in the event its MAC is not in the global BOV. Since check 2 has already performed this operation and the other checks 1-4 cause some change in the timeline, it is typically impossible to safely allow or depend on the transmission of the net formation for the local mobile wireless communications device to occur in the succeeding epoch. For conditional checks 5 and 7-10, the mobile wireless communications device is allowed to perform the final check. Since conditional check 6 is for a time master mobile wireless communications device re-election process, there is generally also no need to perform the final check.

Figure 11:
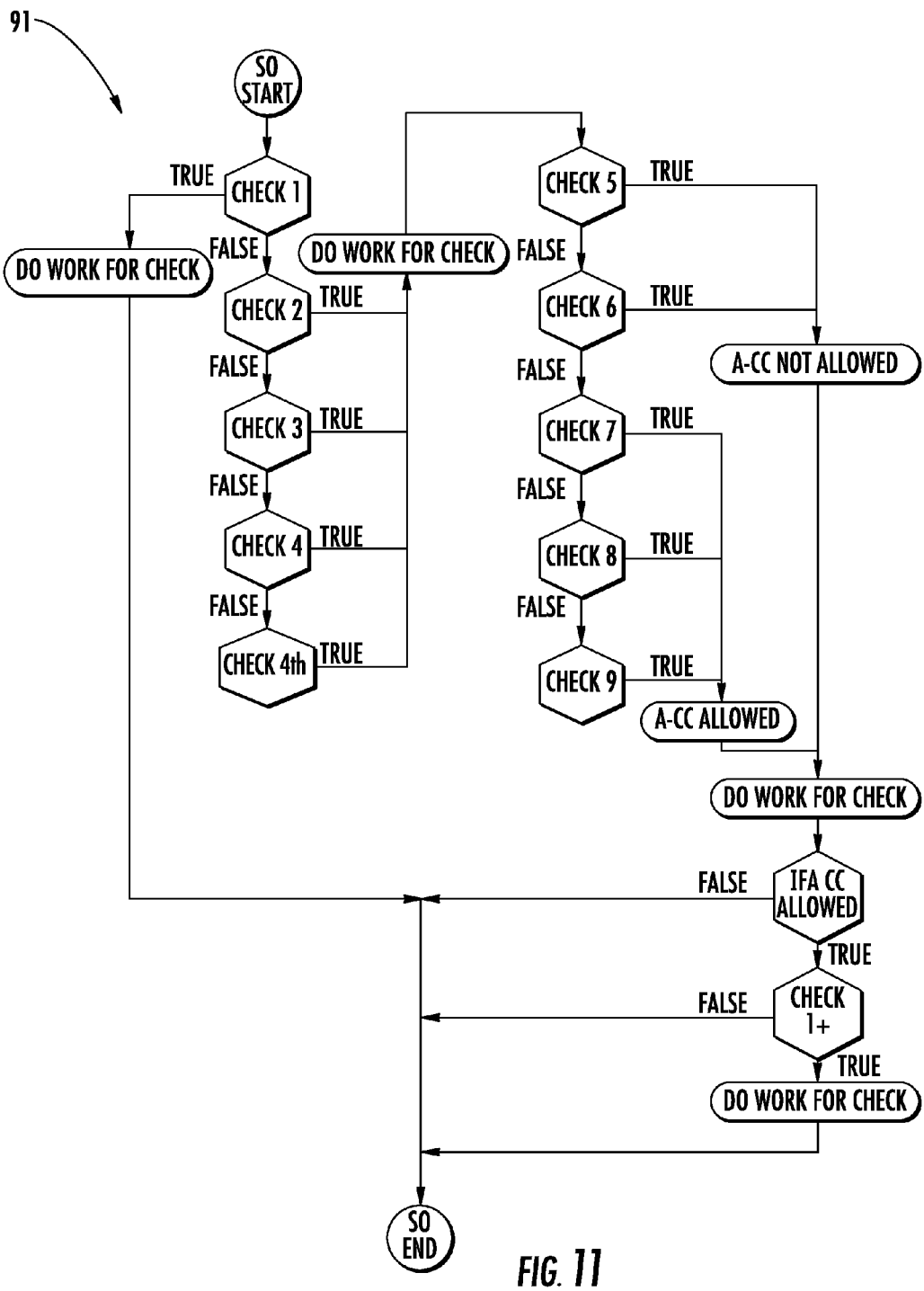
FIG. 11 is a state machine diagram of the slave operational state in accordance with the present invention.

The previous SLAVE OPERATION state description can be diagramed as a state machine in and of itself. Therefore, referring now additionally to FIG. 11, the actual state machine diagram 91 of the slave operational state as implemented in the software version of NNW is illustrated. It is the state machine within a state compounded with events from previous epochs causing events in succeeding epochs that makes the slave Operation state more or relatively complicated.

The diagram 91 is simplified in that the checks are provided as "number" conditional statements. For the purposes of simplicity, the actual actions that take place after a condition is met is reduced to a simply block called "Do Work for Check." This reduces the number of action blocks required to diagram the internal state machine.

Frequency occupation is now described. The timing and hopping of the narrowband networking waveform (NNW) may be modem dependant. A slot includes X hops of the underlying hopping waveform. In each slot, the first hop, (or a portion thereof) is used to allow a receiver to correlate on the RF signal. Once fine timing is achieved, a receiver is able to follow a transmitter (if it knows the hopping pattern) and maintain synchronization across hops. The hops 2 through (X−1) are used for data exchange. Currently the Xth hop in a slot is unused. This is to give the transmitter sufficient time to transition to receive for the subsequent slot, and to give the owner of the next slot sufficient time to transition to transmit.

Any information transfer pre-supposes that mobile wireless communications devices 20 are synchronized in time and are following the same hopping pattern. This synchronization state is referred to as NETWORK SYNC. It is achieved when the network or mobile wireless communications system 10, or equivalently the start of the TDMA epoch, is referenced to a common time base, and thus agree on the phase state of the hopping pattern. The phase state of the hopping pattern can be known if the epoch is synchronized in time and an epoch count is used and is agreed to by all nodes in the network. The epoch count is the number of epochs that have transpired since a common start of time.

Before the network or mobile wireless communications system 10 achieves network synchronization, it is assumed that the internal clocks of the mobile wireless communications devices 20 are set within a predefined time limit of each other, or have a GPS as a time source. Mobile wireless communications devices 20 that are within the time window of each other and are using the same TRANSEC key and network ID as each other are said to be in TRANSEC SYNC. Mobile wireless communications devices 20 in the TRANSEC SYNC state can exchange information using SYNC messages while mobile wireless communications devices in the NETWORK SYNC state exchange application based data using either NORMAL messages or SYNC messages. A mobile wireless communications device 20 has the ability to listen for both the SYNC message type or the NORMAL message type.

The difference between SYNC messages and NORMAL messages is twofold. First, the frequency hop pattern used is different (not necessarily orthogonal). Second, the overhead for SYNC messages is considerably higher than for NORMAL messages, leading to SYNC messages containing fewer payload bits than NORMAL messages.

For both the SYNC messages and the NORMAL messages, the hopping pattern is derived from the equation below, which will be described in further detail below.

[F]=HASH("NetworkID", Day Count, SYNC Interval, Epoch Count, Slot, Hop)

The network ID is a unique identification string or byte array, for example, an ASCII string parameter entered by the network planner. Coarse time includes the two fields "Day Count" and "Sync Interval." The "Day Count" field is the number of days that have expired since the common start of time.

The SYNC Interval is a counter with a maximum value that may be implementation specific, for example, an even divisor of a 24-hour period. By dividing 24 hours into an even number of intervals, there is a discrete and repeating reference pattern throughout every day. Original formulas used an epoch period for Time of Day referencing, which varies based on the number of slots, and thus may cause issues with the 24 hour roll over. Roll over issues are reduced by accounting for the 2400 modulus nature of the SYNC interval value. To calculate the number of SYNC intervals per day, the system uses the following equation:

$$T_{SYNC} = (int)\frac{(hrs*3600)+(min*60)+(sec)}{36}$$

The final three parameters have the same name for both SYNC and NORM slots, but the values passed into the function differ. SYNC message populate the "Epoch Count," "Slot," and "Hop" parameters with zero values, while the NORM message format uses the actual "Slot" number and "Hop" number as arguments. Furthermore, the NORM slots use the number of epochs that transpired since the common start of time for the "Epoch Count" field. SYNC Intervals are not aligned with epoch boundaries. Therefore, frequency calculation should account for future change in SYNC interval during the current epoch.

The output of the hashing function in the equation above returns the index into the hopset to select one of the available transmit frequencies (F). Frequencies are included in a lookup table that is determined by the user's hop set configuration. In order to determine the frequency, the parameters in the function listed above are hashed, and the resulting bit stream is then combined bit wise to create an offset into the hopset table.

The SYNC message is a hardcoded number of hops (N), the final hop of which is not used for transmission. The first "S" hops of the remaining (N−1) hops are used for reference frequencies ($F_X$), where $1<=X<=S$. The other "D" hops are used for data bearing frequencies ($F_D$), where $(S+1)<=D<=(N-1)$. The reference hop frequencies and the data hop frequencies used in the SYNC message are chosen using coarse time of day ($+/-S/2*T_{SI}$), the number of reference hops times the period of a synch interval. The middle reference frequency $F_{((S/2)+1)}$ is chosen as the frequency indexed by the mobile wireless communications device's current time ("Day Count" "Sync Interval") and network ID. The value of the $F_X$ frequency remains fixed for the current SYNC Interval (SI). The reference frequencies $F_1, F_2, \ldots F_S$ are computed with the same algorithm as the center frequency, but using the SYNC Intervals prior to and after the current SI. For example, using S as an index for the reference frequencies, the following equation can be used to determine the S frequencies for a Time of Day synchronization:

$$\sum_{x=0}^{x=S} F_X = T_{SI}*\left(X-\left\lfloor\frac{S}{2}\right\rfloor\right)$$

Best practices suggest that S be an odd number, such that there are an even number of SI's prior to and after the current SI. As time progresses the current SI is shifted back in time and the next $F_X$ becomes the new center frequency. That is the $F_{((S/2)+2)}$ frequency becomes the $F_{((S/2)+1)}$ frequency upon crossing of the next SYNC Interval boundary. Similarly, the $F_D$ frequencies are chosen using the same algorithm for selecting frequencies $F_1$ through $F_S$, but using SYNC Intervals for $F_S, F_{(S+1)}, \ldots F_{(N-1)}$ seconds in the future.

The mobile wireless communications device 20 transmits a message on each frequency $F_X$ which represents the number of hops to wait until the first data hop $F_{(S+1)}$ from the current hop's transmission. For example, using 7 SYNC Intervals, the transmitter typically uses the following frequency and data bit pattern for the first 7 hops:

| Frequency | # Hops until $F_{(S+1)}$ | HOP |
| --- | --- | --- |
| F1 | 0 | 7 |
| F2 | 2 | 5 |
| F3 | 4 | 3 |
| F4 | 6 | 1 |

-continued

| Frequency | # Hops until $F_{(S+1)}$ | HOP |
|---|---|---|
| F5 | 5 | 2 |
| F6 | 3 | 4 |
| F7 | 1 | 6 |

To receive a SYNC message, the receiver computes the frequency using the hashing functions above. Unlike the transmitter, instead of one $F_D$ frequency list, the receiver will create a set of $F_D$ frequencies; one for each prospective $F_X$ reference frequency. In so doing, the receiver is ready to listen to any data transmission sequence regardless of the source transmitter's time of day, so long as it is within the S SYNC Interval period. The receiver listens (i.e. "dwells") on the center frequency calculated based on its current SYNC Interval. If the transmitting radio has a time reference within +/−S/2*$T_{SI}$ seconds of the receiving radio's time, then the frequency that the receiver is tuned to is one of the S $F_X$ frequencies of the transmitter.

The receiver decodes one of the $F_X$ messages from the set of the transmitter's $F_X$ list. The decoded data informs the receiver of the number of hops to wait until the $F_D$ frequencies begin. This hop offset is used to determine the $F_D$ frequency set to be used for the data bearing hops as well as adjust the local time to course synchronization with the transmitting node. Given that the receiver's center frequency should be S/2 hops away from $F_{D1}$, and the receiver is listening to its local time based center frequency, if the message value indicates less than S/2 hops, the receiver can determine the actual $F_X$ of the transmitter, hence the number of SYNC Intervals difference from the receiver. The number of SYNC intervals difference is used as the pointer to the $F_D$ frequency set that needs to be loaded into the hardware for the data receive portion of the SYNC slot.

The data hops of the SYNC slot provides a finer time tuning along with network control information. Since there is a possibility that a receive mobile wireless communications device's center frequency could be the transmitting mobile wireless communications device's $F_S$, the receiver may miss the $F_{D1}$ frequency hop while attempting to decode the $F_S$ message. This being the case, the $F_{D1}$ data hop should be repeated in another $F_D$ hop. This redundancy allows for all mobile wireless communications devices 20 to ensure that they have received a complete SYNC message and can act appropriately on the information encoded.

The hashing function as described in [0141] is called multiple times to calculate the frequencies for the different hops of the slot. The "Sync Interval" uses offsets calculated above, while the Epoch Count, Slot, and Hop parameters are given ZERO values. Since there are S possible course-time periods that the transmitter may be synchronized to, the receiving mobile wireless communications device must calculate $F_{(S+1)}$ through $F_{(N-1)}$ for each SYNC time offset. This implies an (S*D) frequency list per SYNC Interval. Unlike the frequencies for NORM slots throughout the epoch, this list is only generated on the SYNC interval boundary. SYNC interval boundaries are not guaranteed to correspond to epoch periods. This implies that the maximum number of frequencies that are pre-calculated and stored for SYNC slot messages in a given epoch is (S*D*2). There may be a point in an epoch when the SYNC Interval is crossed, causing the initial SYNC slot to be based on SYNC Interval "X" while the rest of the epoch's SYNC slots are based on SYNC Interval "X+1." The frequency and gold code derivation for SYNC Messages is:

Reference Frequencies
[$F_1$]=HASH(Network ID, Day Count, 1−S/2, 0, 0, 0)
[$F_2$]=HASH(Network ID, Day Count, 2−S/2, 0, 0, 0)
. . .
[$F_S$]=HASH(Network ID, Day Count, S−S/2, 0, 0, 0)
Data Frequencies
[$F_{D1}$]=HASH(Network ID, Day Count, (S−S/2)+1, 0, 0, 0)
[$F_{D2}$]=HASH (Network ID, Day Count, (S−S/2)+2, 0, 0, 0)
. . .
[$F_{N-1}$]=HASH(Network ID, Day Count, (S−S/2)+(N−1), 0, 0, 0)

The hop frequencies for NORMAL messages are determined in a similar method to that of SYNC slot hop frequencies. The hop frequency for each hop of each message can be uniquely determined by the Network ID, Day Count, SYNC Interval, Epoch Count, Slot number, and the hop number within the slot. Without knowledge of the transmitter's hop pattern or timing information for the NORMAL message, a receiver cannot receive nor extract the transmitter's message. The frequency derivation equation for NORM slot messages is:

[F]=HASH("Network ID", Day Count, SYNC Interval, Epoch Count, Slot, Hop)

The input bit array for the NORM Frequency hash algorithm is nearly identical to the previously mentioned SYNC frequency array. The Network, Day Count, and SYNC Interval are used in an identical manner as the SYNC frequencies. However, unlike the SYNC frequencies, the Epoch Count, Slot ID, and Hop count fields are not filled with zeros.

The Epoch Count (EC) is a value derived from the common start of time. The common start of time is subtracted from the current time of day and then divided by the period of an epoch to result in the EC. This field roll over is based upon the number of bits used to represent the EC. The next field is the Slot ID for which the TRANSEC is currently calculating frequencies. The final field is the hop number. There are only X hops per slot, and therefore, only ln(X) bits are desired.

The dynamic slot assignment for pseudo-mobile ad-hoc TDMA networks, for example, as described herein is now described. The narrowband networking waveform (NNW) engine generally requires that all mobile wireless communications devices layout epoch configurations identically. The NNW defines two hardcoded layouts, for example. Other or additional configurations may be possible. For the purposes of expansion and interoperability, an epoch layout algorithm has been developed so that any combination of number of users, digital voice slots enabled, and minimum number of SYNC slots results in a deterministic and viable slot arrangement.

The Digital Voice (DV) enable option should be checked prior to layout of an NNW epoch. The succeeding discussion will clarify the math used to determine the impact of DV on the epoch layout, and does not preclude the use of other voice codecs.

A frame based digital vocoder uses an X bit synchronous frames for every Y ms of audio. Knowing the number of channel bits per slot is C bits, the maximum number of vocoder frames per slot may be derived. Knowing that each slot is T ms, the maximum number of slots between DV slots may be obtained. The equations below are used to determine the DV modulus that is used in the epoch layout procedure.

$$\frac{frames}{slot_{MAX}} = \frac{bits/slots}{bits/frame}$$

-continued $$\frac{Voice_{(ms)}}{slot} = \frac{frame/slot_{MAX}}{ms/frame}$$

$$Voice\ Slot_{distance} = \frac{Voice_{(ms)}/slot}{Time_{slot}}$$

$$MOD_{DV} = Voice\ Slot_{distance} - 1$$

Knowing that there are a variety of physical layer (PHY) modulations and encoding that can be used for the modem, the same equations used above can be used to determine the DV modulus used in the epoch layout for any underlying modem that supports Fixed Frequency and Frequency Hopping TDMA.

Having determined the DV Modulus value as described above, along with the user's configuration, NNW can automatically arrange slots to evenly distribute DV slots, network slots, and user slots across the maximum epoch size. The original algorithm could layout an epoch of any length, provided it included enough slots to support 1 slot/user, a minimum of 1 network slot, and a DV slots every DV modulus. The epoch layout process uses the following postulates:

All networks support 8 Network slots
DV enabled epochs support a maximum of 48 users
Data only epochs support a maximum of 64 users.

Of course, other amounts of slots and/or users may be used or supported. With this in mind, the epoch lengths to 70 slots were hard coded with DV enabled, and 72 slots with DV disabled. By fixing epoch lengths, the configuration can support any number of users provided that the number of users evenly divides into the maximum number of users.

The DV enabled status and DV modulus ($MOD_{DV}$) value combine to modify the Epoch layout process with a single value "DV Slots per Epoch" ($N_{DV}$). If DV is disabled, this value is set to 0; however if DV is enabled, then the equation, above, is used to determine the number of DV slots that will be evenly distributed throughout the epoch. Once the $MOD_{DV}$ value is determined as 0 or some positive integer, the algorithm continues below. Digital voice slots per epoch are calculated according to the equation below:

$$N_{DV} = ceiling[S_E/MOD_{DV}]$$

Where:
  $S_E$—constant value of 70 when DV is enabled
    —constant value of 72 when DV is disabled
  $MOD_{DV}$—value determined above Before proceeding with the actual layout, additional values must be determined to prepare for dynamic slot allocation. First, a $MOD_{SYNC}$ value should be rendered which is used in the last conditional statement of the algorithm's loop. Since it is highly desirable that this does not change, the value should be calculated prior to executing the loop.

$$N_{US} = N_{SpE} - (N_S + N_{DV})$$

$$N_{SpU} = \frac{N_{US}}{N_U}$$

if ($N_S > 0$)

$$MOD_{SYNC} = floor\left[\frac{N_S + N_{US}}{N_S} * 16\right]$$

else $$MOD_{SYNC} = floor\left[\frac{N_S + N_{US}}{1} * 16\right]$$

Where:
  $N_{US}$: Total Number of User Slots per Epoch
  $N_U$: Number of Users for this Network
  $N_{SpE}$: Number of Slots per Epoch
  $N_S$: Number of Sync Slots per Epoch
  $N_{DV}$: Number of DV Slots per Epoch
  $N_{SpU}$: Number of Slots per User per Epoch After calculating the limiting values, the algorithm places the first SYNC slot in the first slot of the epoch. The algorithm then continues performing the slot assignment algorithm for all slots in the set [2, $N_{SpE}$).

The looping portion of the algorithm performs the following pseudo code conditional check for each slot. The loop must maintain a reference to the current slot being assigned, the running total of sync slots that have been assigned, and the running total of the number of DV slots that have been assigned. The $MOD_{DV}$ and $MOD_{SYNC}$ are the values determined in the above equations.

```
If (DV is enabled) and (slot mod MOD_DV == 2)
    - Assign the slot as a DV slot
Else
    If (number of Sync slots assigned == N_S)
        - Assign the slot as a USER slot
    Else
        DV_check = (current slot – number of DV slots assigned) mod (MOD_SYNC / 16)
        If ( floor(DVcheck) == 1 )
            - Assign slot as a SYNC slot
        Else
            - Assign slot as a USER slot
        End
    End
End
```

This algorithm may be considered somewhat incomplete in that it does not account for slot stuffing the epoch with SYNC slots when the resulting $N_S$ Mod $N_{DV}$ is not 0. For a true auto-generated Epoch layout, if the number of slots per epoch divided by the number of DV slots per epoch is not an integer, then the epoch should be filled with additional SYNC slots to ensure a synchronous flow of DV coding and decoding. Since the current inception of NNW provides for a single length epoch with a fixed number of SYNC slots per epoch, the values below may be generated.

$N_S=8$
$N_{US}=48$
$N_{DV}=14$

Therefore, the modulus of the number of slots per epoch by the number of DV slots is generally always 0. This means that no SYNC slot back filling is required, optimizing the number of slots per user and reducing the epoch length.

The final phase of the epoch layout is the assignment of user slot ownership. Each slot has a user MAC ID associated with it in a deterministic manner for radios to decode receptions and time line information consistently.

A single looping function traverses the epoch slots, and for each user slot, assigns a MAC ID in numerically increasing order until all the user slots have been assigned or the maximum number of users has been reached. If the maximum number of users has been reached, but user slots still remain, the loop continues starting with the next slot and the first MAC address. This process is repeated until the last user slot has been assigned.

As will be appreciated by those skilled in the art, the wireless communications system 10 described herein advantageously does not rely on a central control or a static time server, for example. Moreover, synchronization may be achieved regardless of the number of hops, as the timing head relay mobile wireless communications devices are rotated through service, and time forwarding mobile wireless communications devices are self correcting/self assigning.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications system comprising:
   a plurality of wireless communications devices communicating with one another via time division multiple access (TDMA);
   said plurality of wireless communications devices comprising
      a first wireless communications device defining a time master wireless communications device configured to transmit
         a first synchronization message comprising a time value, and a hop count value,
         a first maintenance message comprising unique identifiers (UIDs) of other wireless communications devices in a range of communications from the time master wireless communications device, and
         a timing head relay designation message;
      a second relay wireless communications device defining a timing head relay wireless communications device corresponding to the timing head relay designation message and configured to
         receive the first synchronization message, first maintenance message and timing head relay designation message,
         transmit a second synchronization message comprising an updated time value and an updated hop count, and
         transmit a second maintenance message comprising unique identifiers (UIDs) of other wireless communications devices in a range of communications from the timing head relay wireless communications device; and
      a third wireless communications device defining a time forwarding wireless communications device configured to
         receive the second synchronization message and the second maintenance message,
         transmit a third synchronization message comprising a further updated time value and a further updated hop count when a downstream wireless communications device is outside a range of said timing head relay wireless communications device, and
         transmit a third maintenance message comprising unique identifiers (UIDs) of other wireless communications devices in a range of communications from the time forwarding wireless communications device.

2. The wireless communications system of claim 1, wherein said plurality of wireless communications devices also communicate with one another via frequency hopping.

3. The wireless communications system of claim 1, wherein said time master wireless communications device is configured to transmit the first synchronization message and the first maintenance message in a given TDMA time epoch; and wherein said timing head relay wireless communications device is configured to transmit the second synchronization message and the second maintenance in a first subsequent TDMA time epoch.

4. The wireless communications system of claim 3, wherein said time forwarding wireless communications device is configured to transmit the third synchronization message in a second subsequent TDMA time epoch.

5. The wireless communications system of claim 1, wherein said time master wireless communications device is configured to transmit a time slot message including a designated time slot; and wherein said timing head relay wireless communications device is configured to receive the time slot message and transit in the designated time slot.

6. The wireless communications system of claim 5, wherein said time forwarding wireless communications device is configured to transmit the third synchronization message in a random time slot.

7. The wireless communications system of claim 1, wherein said time forwarding wireless communications device is configured to determine when the downstream wireless communications device is in range of both said time forwarding wireless communications device and another wireless communications device, and discontinue transmitting the third synchronization message when the hop count value to the downstream wireless communications device is greater than a hop count value from the another wireless communications device to the downstream wireless communications device.

8. The wireless communications system of claim 1, wherein each wireless communications device comprises a wireless transceiver and a processor coupled thereto.

9. The wireless communications system of claim 1, wherein each wireless communications device comprises a mobile wireless communications device.

10. A wireless communications system comprising:
    a plurality of mobile wireless communications devices communicating with one another via time division multiple access (TDMA) and frequency hopping;
    said plurality of mobile wireless communications devices comprising
       a first mobile wireless communications device defining a time master mobile wireless communications device configured to transmit
          a first synchronization message comprising a time value, and a hop count value,
          a first maintenance message comprising unique identifiers (UIDs) of other mobile wireless communications devices in a range of communications from the time master mobile wireless communications device, and
          a timing head relay designation message;
       a second mobile wireless communications device defining a timing head relay mobile wireless communications device corresponding to the timing head relay designation message and configured to
          receive the first synchronization message, first maintenance message and timing head relay designation message,
          transmit a second synchronization message comprising an updated time value and an updated hop count, and
          transmit a second maintenance message comprising unique identifiers (UIDs) of other mobile wireless communications devices in a range of communications from the timing head relay mobile wireless communications device; and a third mobile wireless communications device defining a time forwarding mobile wireless communications device configured to
  receive the second synchronization message and the second maintenance message,
  transmit a third synchronization message comprising a further updated time value and a further updated hop count when a downstream mobile wireless communications device is outside a range of said timing head relay mobile wireless communications device, and
  transmit a third maintenance message comprising unique identifiers (UIDs) of other mobile wireless communications devices in a range of communications from the time forwarding mobile wireless communications device.

11. The wireless communications system of claim 10, wherein said time master mobile wireless communications device is configured to transmit the first synchronization message and the first maintenance message in a given TDMA time epoch; and wherein said timing head relay mobile wireless communications device is configured to transmit the second synchronization message and the second maintenance in a first subsequent TDMA time epoch.

12. The wireless communications system of claim 11, wherein said time forwarding mobile wireless communications device is configured to transmit the third synchronization message in a second subsequent TDMA time epoch.

13. The wireless communications system of claim 10, wherein said time master mobile wireless communications device is configured to transmit a time slot message including a designated time slot; and wherein said timing head relay mobile wireless communications device is configured to receive the time slot message and transit in the designated time slot.

14. The wireless communications system of claim 13, wherein said time forwarding mobile wireless communications device is configured to forward the third synchronization message in a random time slot.

15. The wireless communications system of claim 10, wherein said time forwarding mobile wireless communications device is configured to determine when the downstream mobile wireless communications device is in range of both said time forwarding mobile wireless communications device and another mobile wireless communications device, and discontinue transmitting the third synchronization message when the hop count value to the downstream mobile wireless communications device is greater than a hop count value from the another mobile wireless communications device to the downstream mobile wireless communications device.

16. A method of wireless communication in a wireless communications system comprising a plurality of wireless communications devices communicating with one another via time division multiple access (TDMA), the method comprising:
  transmitting from a first wireless communications device from among the plurality of wireless communications devices defining a time master wireless communications device
    a first synchronization message comprising a time value, and a hop count value,
    a first maintenance message comprising unique identifiers (UIDs) of other wireless communications devices in a range of communications from the time master wireless communications device, and
    a timing head relay designation message;
  receiving at a second wireless communications device defining from among the plurality of wireless communications devices defining a timing head relay wireless communications device corresponding to the timing head relay designation message and from among the plurality of wireless communications device, the first synchronization message, first maintenance message and timing head relay designation message;
  transmitting from the timing head relay wireless communications device
    a second synchronization message comprising an updated time value and an updated hop count, and
    a second maintenance message comprising unique identifiers (UIDs) of other wireless communications devices in a range of communications from the timing head relay wireless communications device; and
  receiving at a third wireless communications device from among the plurality of mobile wireless communications devices defining a time forwarding wireless communications device, the second synchronization message and the second maintenance message; and
  transmitting from the time forwarding wireless communications device
    a third synchronization message comprising a further updated time value and a further updated hop count when a downstream wireless communications device is outside a range of the timing head relay wireless communications device, and
    a third maintenance message comprising unique identifiers (UIDs) of other wireless communications devices in a range of communications from the time forwarding wireless communications device.

17. The method of claim 16, wherein the plurality of wireless communications devices also communicate with one another via time frequency hopping.

18. The method of claim 16, wherein the time master wireless communications device transmits the first synchronization message and the first maintenance message in a given TDMA time epoch; and wherein the timing head relay wireless communications device transmits the second synchronization message and the second maintenance in a first subsequent TDMA time epoch.

19. The method of claim 18, wherein the time forwarding wireless communications device transmits the third synchronization message in a second subsequent TDMA time epoch.

20. The method of claim 16, wherein the time master wireless communications device transmits a time slot message including a designated time slot; and wherein the timing head relay wireless communications device receives the time slot message and transits in the designated time slot.

21. The method of claim 20, wherein the time forwarding wireless communications device transmits the third synchronization message in a random time slot.

22. The method of claim 16, wherein the time forwarding wireless communications device determines when the downstream wireless communications device is in range of both the time forwarding wireless communications device and another wireless communications device, and discontinues transmitting the third synchronization message when the hop count value to the downstream wireless communications device is greater than a hop count value from the another wireless communications device to the downstream wireless communications device.

* * * * *